United States Patent
Delrio et al.

(10) Patent No.: US 9,515,892 B2
(45) Date of Patent: Dec. 6, 2016

(54) METHODS, SYSTEMS, AND COMPUTER READABLE MEDIA FOR PROVIDING DIAMETER TRAFFIC ESTIMATOR

(71) Applicant: Tekelec, Inc., Morrisville, NC (US)

(72) Inventors: Jorge Alberto Delrio, Raleigh, NC (US); Travis Earl Russell, Clayton, NC (US); John Kenneth Keane, Raleigh, NC (US)

(73) Assignee: TEKELEC, INC., Morrisville, NC (US)

( * ) Notice: Subject to any disclaimer, the term of this patent is extended or adjusted under 35 U.S.C. 154(b) by 287 days.

(21) Appl. No.: 14/025,464

(22) Filed: Sep. 12, 2013

(65) Prior Publication Data

US 2014/0089807 A1    Mar. 27, 2014

Related U.S. Application Data

(60) Provisional application No. 61/700,141, filed on Sep. 12, 2012.

(51) Int. Cl.
*G06F 15/177* (2006.01)
*H04L 12/24* (2006.01)
*H04L 12/26* (2006.01)

(52) U.S. Cl.
CPC ............. *H04L 41/22* (2013.01); *H04L 41/147* (2013.01); *H04L 43/045* (2013.01)

(58) Field of Classification Search
CPC .. H04L 41/22; G06F 17/30884; G06F 3/0867; G06F 3/0481
See application file for complete search history.

(56) References Cited

U.S. PATENT DOCUMENTS

| | | | |
|---|---|---|---|
| 2006/0198302 A1* | 9/2006 | Sofman et al. | 370/229 |
| 2007/0204034 A1* | 8/2007 | Rexroad et al. | 709/224 |
| 2010/0169475 A1* | 7/2010 | Woundy | H04L 41/0896 709/224 |
| 2010/0299451 A1* | 11/2010 | Yigang et al. | 709/241 |
| 2011/0007630 A1* | 1/2011 | Almhana et al. | 370/230 |
| 2012/0099715 A1* | 4/2012 | Ravishankar et al. | 379/114.01 |
| 2012/0221955 A1* | 8/2012 | Raleigh et al. | 715/736 |

OTHER PUBLICATIONS

Fajardo et al., "Diameter Base Protocol," RFC 6733, pp. 1-152 (Oct. 2012).

* cited by examiner

*Primary Examiner* — Anil N Kumar
(74) *Attorney, Agent, or Firm* — Jenkins, Wilson, Taylor & Hunt, P.A.

(57) ABSTRACT

The subject matter described herein includes methods, systems, and computer readable media for providing a Diameter traffic estimator. According to one exemplary system, a user interface is configured to receive user input regarding a number of subscribers and subscriber network activity types. A Diameter traffic estimator is configured to estimate an indication of Diameter traffic volume based on the number of subscribers and the subscriber network activity type.

25 Claims, 19 Drawing Sheets

| YEAR OF EVOLUTION/GROWTH | | YR 0-1 | YR 0.5-2 | YR 1.5-3 | YR 2-4 | YR 3-5 | YR 5+ |
|---|---|---|---|---|---|---|---|
| TYPICAL NETWORK AND SERVICES EVOLUTION PHASES | | EARLY LTE | VOLTE+ ENTERPRISE | RCS+ OTT/CLOUD | LTE/IMS INTELLIGENT NETWORK | LTE/IMS DIGITAL LIFESTYLE | 5 YR + NETWORK TARGET |
| TOTAL NUMBER OF SUBSCRIBERS (MILLIONS) | | 0.5 | 1 | 2 | 4 | 7 | 15 |
| ATTACHED RATE (%) | | 85% | 85% | 85% | 85% | 85% | 85% |
| NUMBER OF ATTACHED SUBS | | 425000 | 850000 | 1700000 | 3400000 | 5950000 | 12750000 |
| % OF TIME THAT AVERAGE SUBSCRIBER IS ACTIVE (VS IDLE) DURING BUSY HOUR | | 85% | 85% | 85% | 85% | 85% | 85% |
| # OF PDN CONNECTIONS | # OF PDNS | -----SUBSCRIBER MIX: PERCENTAGE OF TOTAL SUBS----- | | | | | |
| % OF SUBS WITH THIS # OF PDN CONNECTIONS (E.G. INTERNET) | 1 | 95% | 70% | 55% | 35% | 15% | 0% |
| % SUBS WITH THIS # OF PDN CONNECTIONS (E.G. INTERNET+IMS) | 2 | 5% | 25% | 25% | 30% | 35% | 0% |
| % SUBS WITH THIS # OF PDN CONNECTIONS (E.G. INTERNET+IMS+DPI) | 3 | 0% | 5% | 15% | 25% | 35% | 50% |
| % SUBS WITH THIS # OF PDN CONNECTIONS (E.G. INTERNET+IMS+DPI+ENTERPRISE) | 4 | 0% | 0% | 5% | 5% | 10% | 30% |
| % SUBS WITH THIS # OF PDN CONNECTIONS (E.G. INTERNET+IMS+DPI+ENTERPRISE+ETC) | 5 | 0% | 0% | 0% | 5% | 5% | 20% |
| | | 100% | 100% | 100% | 100% | 100% | 100% |
| AVERAGE # OF PDNS | | 1.1 | 1.4 | 1.7 | 2.2 | 2.6 | 3.7 |
| MOBILITY MANAGEMENT AND IMS HSS AUTHENTICATION TRAFFIC | | | | | | | |
| MOBILITY MANAGEMENT TRAFFIC | | 50-70% LTE | 60-80% LTE | 70-85% LTE | 80-90% LTE | 85-95% LTE | 100% LTE |
| % OF INBOUND ROAMERS (I.E. PERCENTAGE RELATIVE TO TOTAL SUBSCRIBERS) | 7% | | | | | | |
| % OF OUTBOUND ROAMERS (I.E. PERCENTAGE RELATIVE TO TOTAL SUBSCRIBERS) | 3% | | | | | | |
| NUMBER OF MOBILITY TRANSACTIONS PER SUB PER LTE ATTACHMENT | 3 | | | | | | |
| DURATION OF LTE ATTACHMENT IN THE ABSENCE OF 3G HANDOVERS (HOURS) | 12 | | | | | | |
| ROAMING LTE MOBILITY MANAGEMENT ATTACH/DETACH DIAMETER TPS | | 3 | 6 | 12 | 24 | 41 | 89 |
| TOTAL LTE MOBILITY MANAGEMENT ATTACH/DETACH DIAMETER TPS | | 32 | 63 | 126 | 253 | 442 | 947 |
| NUMBER OF LOCATION UPDATES PER SUB PER HOUR | 0.2 | | | | | | |
| NUMBER OF TRANSACTIONS FOR 3G/4G HANDOVER | 3 | | | | | | |
| # OF HANDOVERS TO/FROM 3G PER SUB/ PER HOUR | # OF HANDOVERS / HOUR | -----SUBSCRIBER MIX: PERCENTAGE OF TOTAL SUBS----- | | | | | |
| % OF SUBS WITH THIS # OF HANDOVERS TO/FROM 3G | 0 | 10% | 20% | 30% | 55% | 90% | 100% |
| % OF SUBS WITH THIS # OF HANDOVERS TO/FROM 3G | 1 | 20% | 30% | 35% | 35% | 10% | 0% |
| % OF SUBS WITH THIS # OF HANDOVERS TO/FROM 3G | 2 | 30% | 25% | 20% | 10% | 0% | 0% |
| % OF SUBS WITH THIS # OF HANDOVERS TO/FROM 3G | 3 | 40% | 25% | 15% | 0% | 0% | 0% |
| | | 100% | 100% | 100% | 100% | 100% | 100% |
| AVERAGE # OF HANDOVERS | | 2.0 | 1.6 | 1.2 | 0.6 | 0.1 | 0.0 |
| ROAMING MOBILITY MANAGEMENT (ATTACH/DETACH + HANDOVERS) DIAMETER TPS | | 74 | 119 | 190 | 211 | 180 | 301 |
| TOTAL DIAMETER TPS MOBILITY MANAGEMENT (ATTACH/DETACH + HANDOVERS) | | 797 | 1268 | 2036 | 2254 | 1928 | 3221 |
| SERVICE PROVIDER WIFI | | | | | | | |
| NUMBER OF WIFI REGISTRATION TRANSACTIONS | 2 | | | | | | |
| % SUBSCRIBER WITH SERVICE PROVIDER WIFI ACCESS | | 10% | 15% | 20% | 25% | 30% | 35% |
| # OF REGISTRATIONS TO SP WIFI PER SUB PER HOUR | | 2.0 | 2.5 | 3.0 | 3.5 | 4.0 | 4.5 |
| TOTAL DIAMETER TPS FOR SP WIFI REGISTRATIONS | | 46 | 172 | 550 | 1603 | 3848 | 10822 |
| IMS HSS AUTHENTICATION (IMS+IMS APPLICATION SERVERS) | | | | | | | |
| NUMBER OF IMS REGISTRATION TRANSACTIONS PER LTE ATTACHMENT | 4 | | | | | | |
| ROAMING LTE IMS REGISTRATION ATTACH/DETACH DIAMETER TPS | | 0 | 2 | 7 | 20 | 47 | 118 |
| TOTAL LTE IMS REGISTRATION ATTACH/DETACH DIAMETER TPS | | 2 | 25 | 76 | 219 | 501 | 1263 |
| NUMBER OF IMS RE-REGISTRATIONS PER HOUR | 0.33 | | | | | | |
| NUMBER OF RE-REGISTRATION TRANSACTIONS | 1 | | | | | | |
| ROAMING LTE IMS RE-REGISTRATION DIAMETER TPS | | 0 | 2 | 7 | 20 | 46 | 117 |
| TOTAL LTE IMS RE-REGISTRATION DIAMETER TPS | | 2 | 25 | 75 | 217 | 496 | 1251 |
| IMS HSS AUTHENTICATION (IMS APPLICATION SERVERS) | | | | | | | |
| NUMBER OF TRANSACTIONS PER IMS HSS AUTHENTICATION | 1 | | | | | | |
| % SUBSCRIBER PENETRATION FOR SERVICES REQUIRING IMS AS AUTHENTICATION | | 50% | 55% | 60% | 65% | 70% | 75% |
| IMS HSS AUTHENTICATION TRANSACTIONS PER SUB PER BUSY HOUR | | 1.50 | 1.75 | 2.00 | 2.25 | 2.50 | 2.75 |
| ROAMING IMS HSS AS AUTHENTICATION DIAMETER TPS | | 0 | 7 | 26 | 90 | 246 | 730 |
| TOTAL IMS HSS AS AUTHENTICATION DIAMETER TPS | | 5 | 73 | 273 | 961 | 2631 | 7816 |
| TOTAL ROAMING MOBILITY MANAGEMENT + IMS HSS DIAMETER TPS | | 75 | 130 | 230 | 341 | 519 | 1266 |
| TOTAL MOBILITY MANAGEMENT + IMS HSS + WIFI AUTHENT. DIAMETER TPS | | 852 | 1563 | 3010 | 5253 | 9403 | 24372 |

FIG. 14

| POLICY TRAFFIC | | | | | | | |
|---|---|---|---|---|---|---|---|
| | SUBSCRIBER POLICY ACTIVITY LEVEL | | ----SUBSCRIBER MIX: PERCENTAGE OF TOTAL SUBS---- | | | | |
| | "BEST EFFORT" GROUP | | 0% | 0% | 0% | 0% | 0% | 0% |
| | VERY LOW POLICY ADOPTION GROUP | | 60% | 55% | 50% | 45% | 40% | 35% |
| | LOW POLICY ADOPTION GROUP | | 20% | 20% | 25% | 25% | 30% | 30% |
| | MEDIUM POLICY ADOPTION GROUP | | 20% | 25% | 25% | 30% | 30% | 35% |
| | HIGH POLICY ADOPTION GROUP | | 0% | 0% | 0% | 0% | 0% | 0% |
| | REFERENCE SUBSCRIBER GROUP FOR POLICY | | 0% | 0% | 0% | 0% | 0% | 0% |
| 1500 | | | 100.0% | 100.0% | 100.0% | 100.0% | 100.0% | 100.0% |
| | AVERAGE # OF DIAMETER EVENTS PER SUB PER BUSY HOUR | | 4.5 | 6.5 | 9.0 | 10.8 | 12.9 | 15.6 |
| | AVERAGE POLICY TRANSACTIONS PER DIAMETER EVENT | | 1.9 | 2.3 | 2.7 | 3.1 | 3.4 | 3.6 |
| | % OF POLICY EVENTS (RELATIVE TO AVERAGE # OF EVENTS) THAT INVOLVE Rx SESSION | 100% | | | | | | |
| | Rx SESSION (CALL HOLDING TIME) (SECONDS) | 240 | | | | | | |
| | # OF CONCURRENT DIAMETER POLICY SESSIONS/SUB | | 1.3 | 1.8 | 2.6 | 3.5 | 4.4 | 7.0 |
| | TOTAL NUMBER OF CONCURRENT DIAMETER POLICY SESSIONS | | 560044 | 1568537 | 4363900 | 11763008 | 26285092 | 88794161 |
| | NUMBER OF TRANSACTIONS TO SETUP/TERMINATE DEFAULT BEARER | 3 | | | | | | |
| | LTE PDN (DEFAULT BEARER) ATTACH+DETACH DIAMETER TRANSACTIONS PER SECOND (TPS) | | 31 | 80 | 201 | 508 | 1054 | 3276 |
| | TOTAL DIAMETER TPS POLICY | | 908 | 3520 | 11652 | 31981 | 74230 | 199905 |
| OFF-LINE CHARGING TRAFFIC | | | | | | | | |
| | % OFFLINE - CHARGING SUBS | | 85.0% | 80.0% | 75.0% | 70.0% | 65.0% | 60.0% |
| | % OF CONCURRENT DIAMETER OFFLINE - CHARGING SESSIONS/SUB | | 1.1 | 1.4 | 1.7 | 2.2 | 2.6 | 3.7 |
| | TOTAL NUMBER OF CONCURRENT DIAMETER OFFLINE - CHARGING SESSIONS | | 379313 | 918000 | 2167500 | 5117000 | 9862125 | 28305000 |
| | NUMBER OF TRANSACTIONS TO SETUP/TERMINATE DEFAULT BEARER SESSION | 2 | | | | | | |
| | LTE PDN (DEFAULT BEARER) ATTACH+DETACH DIAMETER TRANSACTIONS PER SECOND (TPS) | | 18 | 43 | 100 | 237 | 457 | 1310 |
| | # OF ACCOUNTING TRANSACTIONS/SUB DURING BUSY HOUR | # OF TRANSACTIONS PER HOUR | ----SUBSCRIBER MIX: PERCENTAGE OF TOTAL SUBS---- | | | | | |
| | # OF SUBS WITH THIS # OF ACCOUNTING TRANSACTION/HOUR | 0 | 10% | 0% | 10% | 10% | 5% | 0% |
| 1502 | # OF SUBS WITH THIS # OF ACCOUNTING TRANSACTION/HOUR | 2 | 10% | 16% | 10% | 10% | 10% | 0% |
| | # OF SUBS WITH THIS # OF ACCOUNTING TRANSACTION/HOUR | 5 | 80% | 65% | 45% | 25% | 10% | 10% |
| | # OF SUBS WITH THIS # OF ACCOUNTING TRANSACTION/HOUR | 10 | 0% | 15% | 25% | 35% | 40% | 40% |
| | # OF SUBS WITH THIS # OF ACCOUNTING TRANSACTION/HOUR | 15 | 0% | 0% | 10% | 15% | 25% | 35% |
| | # OF SUBS WITH THIS # OF ACCOUNTING TRANSACTION/HOUR | 20 | 0% | 0% | 0% | 5% | 10% | 15% |
| | | | 100.0% | 100.0% | 100.0% | 100.0% | 100.0% | 100.0% |
| | AVERAGE NUMBER OF TRANSACTIONS PER SUB DURING BUSY HOUR | | 4.20 | 4.95 | 6.45 | 8.20 | 10.45 | 12.50 |
| | % OF CREDIT SESSIONS (ON-LINE CHARGING) PER OFF-LINE SUB DURING BUSY HOUR | | 0.0% | 5.0% | 10.0% | 15.0% | 20.0% | 25.0% |
| | DIAMETER TPS OFCS | | 439 | 978 | 2385 | 5658 | 11683 | 27873 |
| ON-LINE CHARGING TRAFFIC | | | | | | | | |
| | % ONLINE CHARGING SUBS | | 15.0% | 20.0% | 25.0% | 30.0% | 35.0% | 40.0% |
| | % OF CONCURRENT DIAMETER ONLINE- CHARGING SESSIONS/SUB | | 1.3 | 1.8 | 2.6 | 3.5 | 4.4 | 7.0 |
| | TOTAL NUMBER OF CONCURRENT DIAMETER ONLINE-CHARGING SESSIONS | | 84007 | 313707 | 1090975 | 3528903 | 9199782 | 35517664 |
| | NUMBER OF TRANSACTIONS TO SETUP/TEAR DOWN DEFAULT BEARER SESSION | 2 | | | | | | |
| | LTE PDN (DEFAULT BEARER) ATTACH+DETACH DIAMETER TRANSACTIONS PER SECOND (TPS) | | 3 | 11 | 33 | 102 | 246 | 874 |
| | # OF CREDIT TRANSACTIONS/SUB DURING BUSY HOUR | # OF TRANSACTIONS PER HOUR | ----SUBSCRIBER MIX: PERCENTAGE OF TOTAL SUBS---- | | | | | |
| 1504 | % SUBS WITH THIS # OF CREDIT TRANSACTIONS/HOUR | 0 | 10% | 0% | 10% | 10% | 5% | 0% |
| | % SUBS WITH THIS # OF CREDIT TRANSACTIONS/HOUR | 4 | 10% | 10% | 10% | 10% | 10% | 0% |
| | % SUBS WITH THIS # OF CREDIT TRANSACTIONS/HOUR | 10 | 80% | 65% | 45% | 25% | 10% | 10% |
| | % SUBS WITH THIS # OF CREDIT TRANSACTIONS/HOUR | 20 | 0% | 15% | 25% | 35% | 40% | 40% |
| | % SUBS WITH THIS # OF CREDIT TRANSACTIONS/HOUR | 35 | 0% | 0% | 10% | 15% | 25% | 35% |
| | % SUBS WITH THIS # OF CREDIT TRANSACTIONS/HOUR | 60 | 0% | 0% | 0% | 5% | 10% | 15% |
| | | | 100.0% | 100.0% | 100.0% | 100.0% | 100.0% | 100.0% |
| | AVERAGE NUMBER OF TRANSACTIONS PER SUB DURING BUSY HOUR | | 8.40 | 11.40 | 16.90 | 23.15 | 30.65 | 37.00 |
| | DIAMETER TPS OCS | | 152 | 684 | 2827 | 9940 | 28108 | 86051 |
| | NET DIAMETER TPS IN LTE-/IMS NETWORK | | 2350 | 6744 | 18873 | 52833 | 123424 | 336201 |
| | NET DIAMETER MPS IN LTE/IMS NETWORK | | 4700 | 13488 | 39746 | 105665 | 246848 | 676402 |
| 1506 | NETWORK INEFFICIENCY FACTOR | | 0% | | | | | |
| | GROWTH MARGIN FACTOR | | 0% | | | | | |
| | TOTAL DIAMETER MPS IN LTE/IMS NETWORK | | 4700 | 13488 | 39746 | 105665 | 246848 | 676402 |

FIG. 15

| YEAR OF EVOLUTION/GROWTH | | YR 0-1 | YR 0.5-2 | YR 1.5-3 | YR 2-4 | YR 3-5 | YR 5+ |
|---|---|---|---|---|---|---|---|
| POLICY EVENTS | | EARLY LTE | VOLTE+ ENTERPRISE | RCS+ OTT/CLOUD | LTE/IMS INTELLIGENT NETWORK | LTE/IMS DIGITAL LIFESTYLE | 5 YR + NETWORK TARGET |
| HIGHEST POLICY ADOPTION SUBSCRIBER GROUP (REFERENCE GROUP) | | | | | | | |
| LTE USE CASE EXAMPLES (POLICY ACTIONS) | TRANSACTIONS/EVENT | # OF EVENT/HOUR | # OF EVENT/HOUR | # OF EVENT/HOUR | # OF EVENT/HOUR | # OF EVENT/HOUR | # OF EVENT/HOUR |
| DATA EVENTS THAT DO NOT GENERATE/IMPLY POLICY ACTIONS | 0 | 4 | 4 | 3 | 3 | 2 | 2 |
| SPEED CAP | 1 | 2 | 3 | 4 | 4 | 4 | 5 |
| THROTTLING, FAIR USAGE | 2 | 1 | 1 | 2 | 2 | 3 | 3 |
| THROTTLING WITH QUOTA MANAGEMENT UPDATE | 3 | 1 | 2 | 3 | 3 | 4 | 4 |
| VOLTE | 4 | 1 | 2 | 3 | 3 | 4 | 4 |
| TURBO BUTTON | 5 | 0.5 | 0.5 | 0.5 | 1 | 1.5 | 2 |
| VIDEO STREAMING (2 EVENT REPORTS) | 6 | 0.5 | 0.5 | 1 | 1 | 1.5 | 2 |
| VIDEO STREAMING WITH OPTIMIZATION | 7 | 0 | 1 | 1 | 2 | 2 | 2.5 |
| REAL TIME VIDEO + VOICE (2 DEDICATED BEARERS) | 8 | 0 | 0 | 0.5 | 1 | 1.5 | 2 |
| USE CASE | 9 | 0 | 0 | 0 | 0 | 0 | 0 |
| USE CASE | 5 | 0 | 0 | 0 | 0 | 0 | 0 |
| USE CASE | 3 | 0 | 0 | 0 | 0 | 0 | 0 |
| USE CASE | 3 | 0 | 0 | 0 | 0 | 0 | 0 |
| USE CASE | 5 | 0 | 0 | 0 | 0 | 0 | 0 |
| USE CASE | 6 | 0 | 0 | 0 | 0 | 0 | 0 |
| USE CASE | 2 | 0 | 0 | 0 | 0 | 0 | 0 |
| USE CASE | 4 | 0 | 0 | 0 | 0 | 0 | 0 |
| USE CASE | 5 | 0 | 0 | 0 | 0 | 0 | 0 |
| USE CASE | 6 | 0 | 0 | 0 | 0 | 0 | 0 |
| USE CASE | 10 | 0 | 0 | 0 | 0 | 0 | 0 |
| TOTAL # OF EVENTS/HR | | 10.0 | 14.0 | 18.0 | 20.0 | 23.5 | 26.5 |
| AVERAGE TRANSACTION/EVENT | | 1.7 | 2.3 | 2.7 | 3.1 | 3.4 | 3.6 |

| SUBSCRIBER GROUP DEFINITION | ACTIVITY LEVEL | # OF POLICY EVENTS | # OF POLICY EVENTS | # OF POLICY EVENTS | # OF POLICY EVENTS | # OF POLICY EVENTS | # OF POLICY EVENTS |
|---|---|---|---|---|---|---|---|
| REFERENCE SUBSCRIBER GROUP FOR POLICY | 100% | 10.0 | 14.0 | 18.0 | 20.0 | 23.5 | 26.5 |
| HIGH POLICY ADOPTION GROUP | 100% | 10.0 | 14.0 | 18.0 | 20.0 | 23.5 | 26.5 |
| MEDIUM POLICY ADOPTION GROUP | 50% | 5.0 | 7.0 | 9.0 | 10.0 | 11.8 | 13.3 |
| LOW POLICY ADOPTION GROUP | 0% | 0.0 | 0.0 | 0.0 | 0.0 | 0.0 | 0.0 |
| VERY LOW POLICY ADOPTION GROUP | 25% | 2.5 | 3.5 | 4.5 | 5.0 | 5.9 | 6.6 |
| "BEST EFFORT" GROUP | 0% | 0.0 | 0.0 | 0.0 | 0.0 | 0.0 | 0.0 |

*FIG. 16*

| YEAR OF EVOLUTION/GROWTH | | YR 0-1 | YR 0.5-2 | YR 1.5-3 | YR 2-4 | YR 3-5 | YR 5+ |
|---|---|---|---|---|---|---|---|
| TYPICAL NETWORK AND SERVICES EVOLUTION PHASES | | EARLY LTE | VOLTE+ ENTERPRISE | RCS+ OTT/CLOUD | LTE/IMS INTELLIGENT NETWORK | LTE/IMS DIGITAL LIFESTYLE | 5 YR + NETWORK TARGET |
| TOTAL NUMBER OF LTE SUBSCRIBERS (MILLIONS) | | 1 | 1 | 1 | 1 | 1 | 1 |
| ATTACHED RATE (%) | | 75% | 75% | 75% | 75% | 75% | 75% |
| NUMBER OF ATTACHED SUBS | | 750000 | 750000 | 750000 | 750000 | 750000 | 750000 |
| % OF DATA-ONLY DEVICES | | 22.5% | 20.0% | 17.5% | 15.0% | 12.5% | 10.0% |
| % OF VOLTE ENABLED DEVICES | | 0.0% | 5.0% | 15.0% | 30.0% | 50.0% | 80.0% |
| AVERAGE NUMBER OF PDNS PER SUBSCRIBER | | 1.1 | 1.3 | 1.6 | 2.0 | 2.5 | 3.1 |
| NO  # OF PDN CONNECTIONS | # OF PDNS | -----SUBSCRIBER MIX: PERCENTAGE OF TOTAL SUBS----- | | | | | |
| % OF SUBS WITH THIS # OF PDN CONNECTIONS (E.G. INTERNET) | 1 | 95% | 70% | 55% | 35% | 15% | 0% |
| % SUBS WITH THIS # OF PDN CONNECTIONS (E.G. INTERNET+IMS) | 2 | 5% | 25% | 25% | 30% | 35% | 0% |
| % SUBS WITH THIS # OF PDN CONNECTIONS (E.G. INTERNET+IMS+DPI) | 3 | 0% | 5% | 15% | 25% | 35% | 50% |
| % SUBS WITH THIS # OF PDN CONNECTIONS (E.G. INTERNET+IMS+DPI+ENTERPRISE) | 4 | 0% | 0% | 5% | 5% | 10% | 30% |
| % SUBS WITH THIS # OF PDN CONNECTIONS (E.G. INTERNET+IMS+DPI+ENTERPRISE+ETC) | 5 | 0% | 0% | 0% | 5% | 5% | 20% |
| | | 100% | 100% | 100% | 100% | 100% | 100% |
| NO | AVERAGE NUMBER OF PDNS | 1.1 | 1.4 | 1.7 | 2.2 | 2.6 | 3.7 |
| LTE HSS MOBILITY MANAGEMENT (S6a, S6d, S13, SWx) | | | | | | | |
| % OF INBOUND ROAMERS (I.E. PERCENTAGE RELATIVE TO TOTAL SUBSCRIBERS) | 7% | 7% | 7% | 7% | 7% | 7% | 7% |
| % OF OUTBOUND ROAMERS (I.E. PERCENTAGE RELATIVE TO TOTAL SUBSCRIBERS) | 3% | 3% | 3% | 3% | 3% | 3% | 3% |
| % OF TIME SUBSCRIBER IS UNDER LTE COVERAGE | | 20% | 45% | 65% | 80% | 90% | 95% |
| % OF 3G S4-SGSNS IN THE NETWORK | | 30% | 40% | 50% | 60% | 70% | 80% |
| NUMBER OF MOBILITY TRANSACTIONS PER SUB PER LTE ATTACHMENT+LTE DETACHMENT | 4 | | | | | | |
| DURATION OF LTE ATTACHMENT (HOURS) | 6 | | | | | | |
| ROAMING LTE ATTACH/DETACH DIAMETER TPS (S6a) | | 3 | 6 | 9 | 11 | 13 | 13 |
| TOTAL LTE ATTACH/DETACH DIAMETER TPS (S6a) | | 30 | 67 | 97 | 119 | 134 | 141 |
| NUMBER OF MOBILITY TRANSACTIONS PER SUB PER 3G ATTACHMENT+ 3G DETACHMENT | 4 | | | | | | |
| DURATION OF 3G ATTACHMENT (HOURS) | 12 | | | | | | |
| ROAMING 3G ATTACH/DETACH DIAMETER TPS (S6d) | | 2 | 2 | 1 | 1 | 0 | 0 |
| TOTAL 3G ATTACH/DETACH DIAMETER TPS (S6d) | | 17 | 16 | 13 | 9 | 5 | 3 |
| NUMBER OF TRANSACTIONS FOR INTER-MME TAU | 2 | | | | | | |
| INTER-MME TAUS PER SUB PER HOUR | | 0.20 | 0.20 | 0.20 | 0.20 | 0.20 | 0.20 |
| ROAMING LTE-LTE MOBILITY (TAU) DIAMETER TPS (S6a) | | 2 | 4 | 5 | 7 | 8 | 8 |
| TOTAL LTE-LTE MOBILITY (TAU) DIAMETER TPS (S6a) | | 17 | 39 | 56 | 69 | 77 | 82 |
| NUMBER OF TRANSACTIONS FOR INTER S4-SGSN RAU | 2 | | | | | | |
| INTER S4-SGSN RAUS PER SUB PER HOUR | | 1.00 | 1.00 | 1.00 | 1.00 | 1.00 | 1.00 |
| ROAMING 3G-3G MOBILITY (RAU) DIAMETER TPS (S6d) | | 10 | 9 | 7 | 5 | 3 | 2 |
| TOTAL 3G-3G MOBILITY (RAU) DIAMETER TPS (S6d) | | 107 | 98 | 78 | 54 | 31 | 18 |
| NUMBER OF TRANSACTIONS FOR LTE-3G (S4 SGSN) MOBILITY (2 WAY) | 6 | | | | | | |
| NUMBER OF TRANSACTIONS FOR LTE-3G (PRE-S4 SGSN) MOBILITY (2 WAY) | 3 | | | | | | |
| INTER S4-SGSN RAUS PER SUB PER HOUR | | 1.50 | 1.25 | 1.00 | 0.75 | 0.50 | 0.25 |
| ROAMING LTE-3G IRAT MOBILITY DIAMETER (S6a AND S6d) | | 122 | 109 | 94 | 75 | 53 | 28 |
| TOTAL LTE-3G IRAT MOBILITY DIAMETER (S6a AND S6d) | | 1304 | 1170 | 1003 | 803 | 568 | 301 |
| NUMBER OF TRANSACTIONS FOR CSFN VOICE CALLS TO 3G (S4 SGSN) | 6 | | | | | | |
| NUMBER OF TRANSACTIONS FOR CSFN VOICE CALLS TO 3G (PRE-S4 SGSN) | 3 | | | | | | |
| ROAMING CSFN VOICE CALLS DIAMETER TPS (S6a AND S6d) | | 19 | 45 | 64 | 71 | 63 | 29 |
| TOTAL CSFN VOICE CALLS DIAMETER TPS (S6a AND S6d) | | 202 | 480 | 686 | 764 | 671 | 309 |
| NUMBER OF EIR VALIDATION TRANSACTIONS PER ATTACHMENT | 1 | | | | | | |
| TOTAL EIR VALIDATIONS TPS (S13) | | 12 | 20 | 27 | 31 | 34 | 35 |
| SERVICE PROVIDER WIFI AAA/HSS AUTHENTICATION | | | | | | | |
| NUMBER OF WIFI AUTHENTICATION TRANSACTIONS | 2 | | | | | | |
| % SUBSCRIBER WITH SERVICE PROVIDER WIFI ACCESS | | 5% | 10% | 15% | 20% | 25% | 30% |
| # OF REGISTRATIONS TO SP WIFI PER SUB PER HOUR | | 0.25 | 0.50 | 0.75 | 1.00 | 1.25 | 1.50 |
| TOTAL DIAMETER SP WIFI REGISTRATIONS TPS (SWx) | | 5 | 20 | 45 | 81 | 126 | 182 |
| TOTAL ROAMING LTE HSS MOBILITY MANAGEMENT DIAMETER TPS | | 157 | 175 | 181 | 170 | 139 | 80 |
| TOTAL LTE HSS MOBILITY MANAGEMENT DIAMETER TPS | | 1694 | 1910 | 2004 | 1928 | 1647 | 1070 |

FIG. 17

| MOBILITY | S6a/S6d | | | | | | | | Sh | | | Slg | Slh | S13 | SWx | | TOTAL TRANSACTIONS |
|---|---|---|---|---|---|---|---|---|---|---|---|---|---|---|---|---|---|
| | AIR/AIA | ULR/ULA | CLR/CLA | PUR/PUA | IDR/IDA | DSR/DSA | NOR/NOA | RSR/RSA | UDR/UDA | PUR/PUA | PNR/PNA | LIR/LIA | RIR/RIA | ECR/ECA | MAR/MAA | SAR/SAA | |
| LTE ATTACH | 1 | 1 | 1 | | | | | | | | | | | | | | 3 |
| LTE DETACH | | | | 1 | | | | | | | | | | | | | 1 |
| 3G ATTACH | 1 | 1 | 1 | | | | | | | | | | | | | | 3 |
| 3G DETACH | | | | 1 | | | | | | | | | | | | | 1 |
| EIR VALIDATION | | | | | | | | | | | | | | | | | |
| WLAN AUTHENTICATION (WLAN AAA-HSS) | | | | | | | | | | | | | | | 1 | 1 | 2 |
| INTER MMETAU | 1 | 1 | | | | | | | | | | | | | | | 2 |
| INTER S4-SGSN RAU | 1 | 1 | | | | | | | | | | | | | | | 2 |
| LTE-3G (S4 SGSN) HANDOVER | 1 | 1 | 1 | | | | | | | | | | | | | | 3 |
| 3G (S4 SGSN)-LTE HANDOVER | 1 | 1 | 1 | | | | | | | | | | | | | | 3 |
| LTE-3G (PRE S4 SGSN) HANDOVER | 1 | | | | | | | | | | | | | | | | 1 |
| 3G (PRE S4 SGSN) HANDOVER | 1 | 1 | | | | | | | | | | | | | | | 2 |
| CSFB VOICE CALL (LTE TO 3G-S4-SGSN TO LTE) | 2 | 2 | | 1 | | | | | | | | | | 1 | | | 6 |
| CSFB VOICE CALL (LTE TO 3G-PE-S4-SGSN TO LTE) | 1 | 2 | 1 | | | | | | | | | | | | | | 3 |

FIG. 18

METHODS, SYSTEMS, AND COMPUTER READABLE MEDIA FOR PROVIDING DIAMETER TRAFFIC ESTIMATOR

PRIORITY CLAIM

This application claims the benefit of U.S. Provisional Patent Application Ser. No. 61/700,141, filed Sep. 12, 2012; the disclosure of which is incorporated herein by reference in its entirety.

TECHNICAL FIELD

The subject matter described herein relates to estimating Diameter traffic. More particularly, the subject matter described herein relates to a methods, systems, and computer readable media for providing a Diameter traffic estimator.

BACKGROUND

Network operators have a need to estimate signaling traffic to properly engineer their networks. As networks have moved to IP multimedia subsystem (IMS) and long term evolution (LTE) equipment, new signaling protocols, such as Diameter are being used. Traffic estimation tools that take into account the messages produced by these new protocols are not currently available. As a result, networks are either over-engineered or under-engineered. Accordingly, there exists a long felt need for methods, systems, and computer readable media for providing a Diameter traffic estimator.

SUMMARY

The subject matter described herein includes methods, systems, and computer readable media for providing a Diameter traffic estimator. According to one exemplary system, a user interface is configured to receive user input regarding a number of subscribers and subscriber network activity types. A Diameter traffic estimator is configured to estimate an indication of Diameter traffic volume based on the number of subscribers and the subscriber network activity types.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which:

FIG. 1 is a diagram illustrating an exemplary graphical user interface for a Diameter traffic estimator according to an embodiment of the subject matter described herein;

FIG. 2 is a diagram illustrating a drop down menu of the graphical user interface that is configured to allow the user to select a network attachment type according to an embodiment of the subject matter described herein;

FIG. 3 is a diagram illustrating a drop down menu of the graphical user interface that allows the subscriber to select a first subscriber activity type of a three minute call in an LTE or a circuit switched network according to an embodiment of the subject matter described herein;

FIG. 4 is a diagram illustrating a drop down menu of the graphical user interface which allows the user to select an activity type associated with the sending of a text message according to an embodiment of the subject matter described herein;

FIG. 6 is a diagram illustrating a menu of the graphical user interface which allows the user to select roaming or home network options for the establishment of a data connection according to an embodiment of the subject matter described herein;

FIG. 7 is a diagram illustrating a drop down menu of the graphical user interface in which the user can select a fair usage or other policy assumption to be applied to the network usage of each subscriber according to an embodiment of the subject matter described herein;

Figure 8:
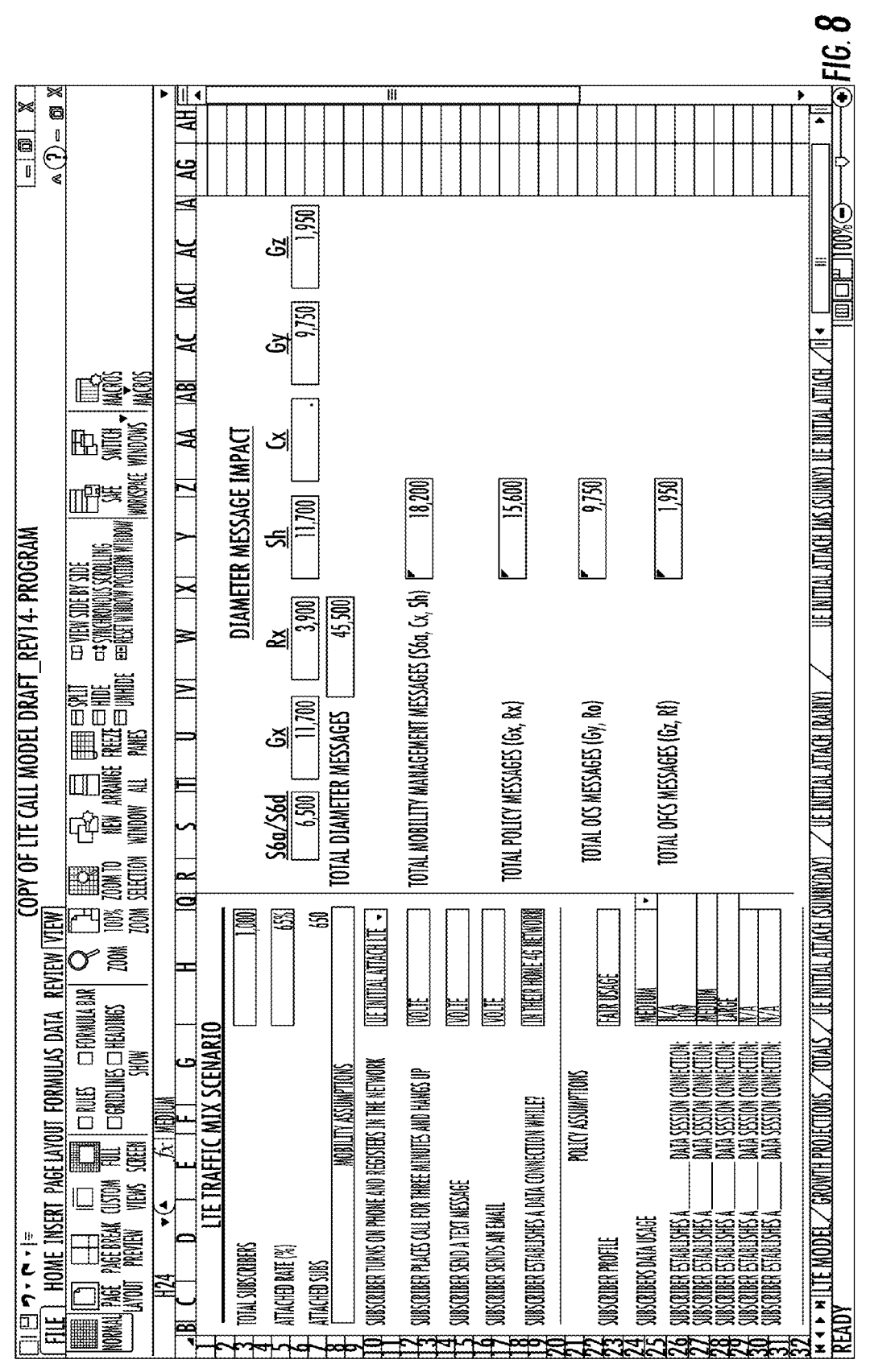

FIG. 8 is a diagram illustrating a menu of the graphical user interface which allows the user to select subscriber data usage according to an embodiment of the subject matter described herein;

FIG. 9 is a diagram illustrating a menu of the graphical user interface which presents the user with a drop down menu where the user can select a data service type according to an embodiment of the subject matter described herein;

FIG. 10 is a diagram illustrating a screen displayed by the of a graphical user interface for presenting Diameter messages per second per interface for annual growth projections according to an embodiment of the subject matter described herein;

FIGS. 14 and 15 are tables illustrating exemplary Diameter traffic volume estimates for different LTE network adoption phases that may be used by a Diameter traffic estimator according to an embodiment of the subject matter described herein;

FIG. 16 illustrates tables used to estimate the volumes of policy traffic estimates in FIGS. 14 and 15;

FIG. 17 is a table illustrating numbers of mobility management and authentication transactions for different traffic mix assumptions and LTE adoption phases; and FIG. 18 is a table illustrating the numbers of specific transaction types per interface for different mobility management and voice call scenarios.

DETAILED DESCRIPTION

Figure 1:
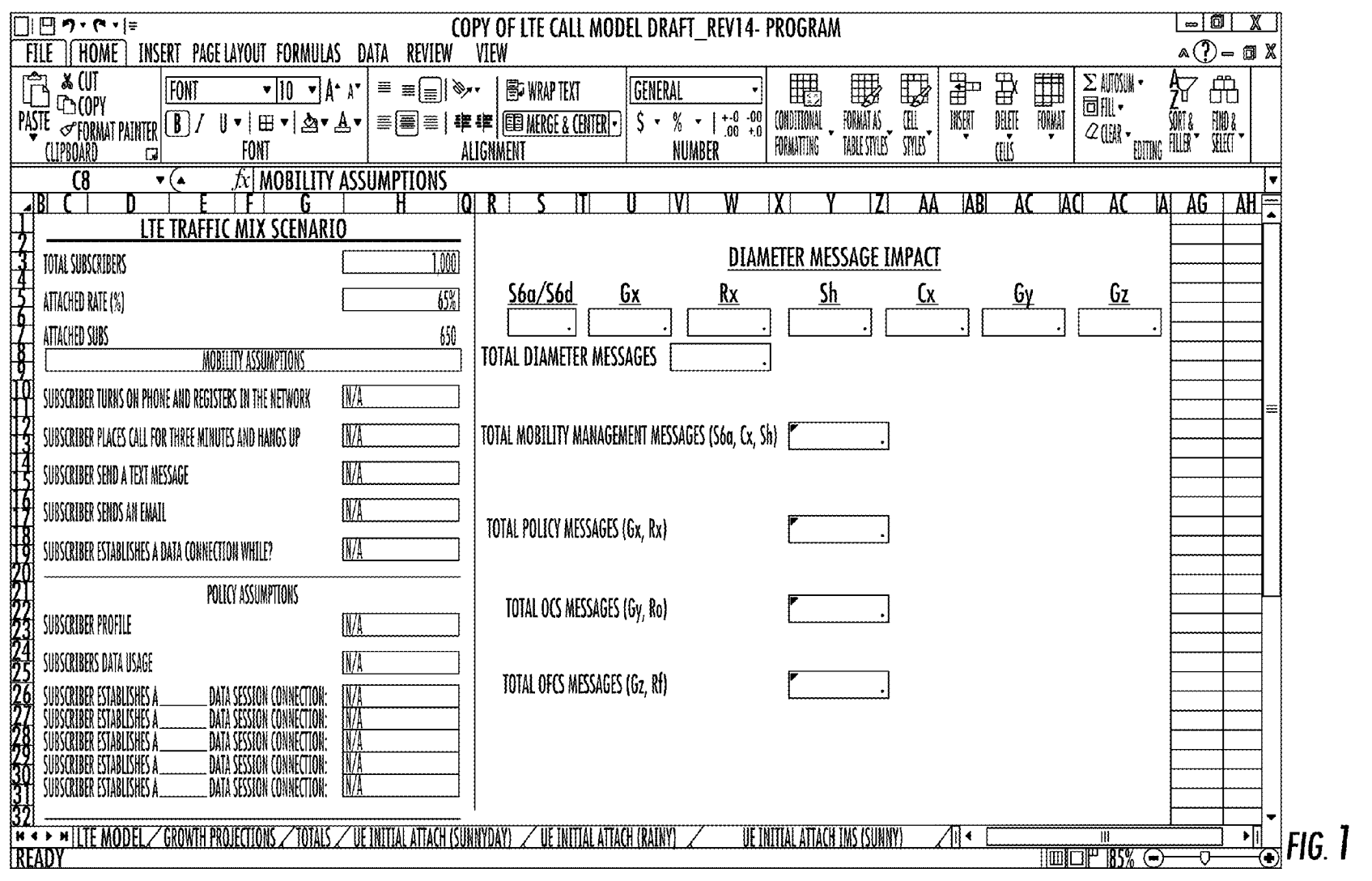
Figure 5:
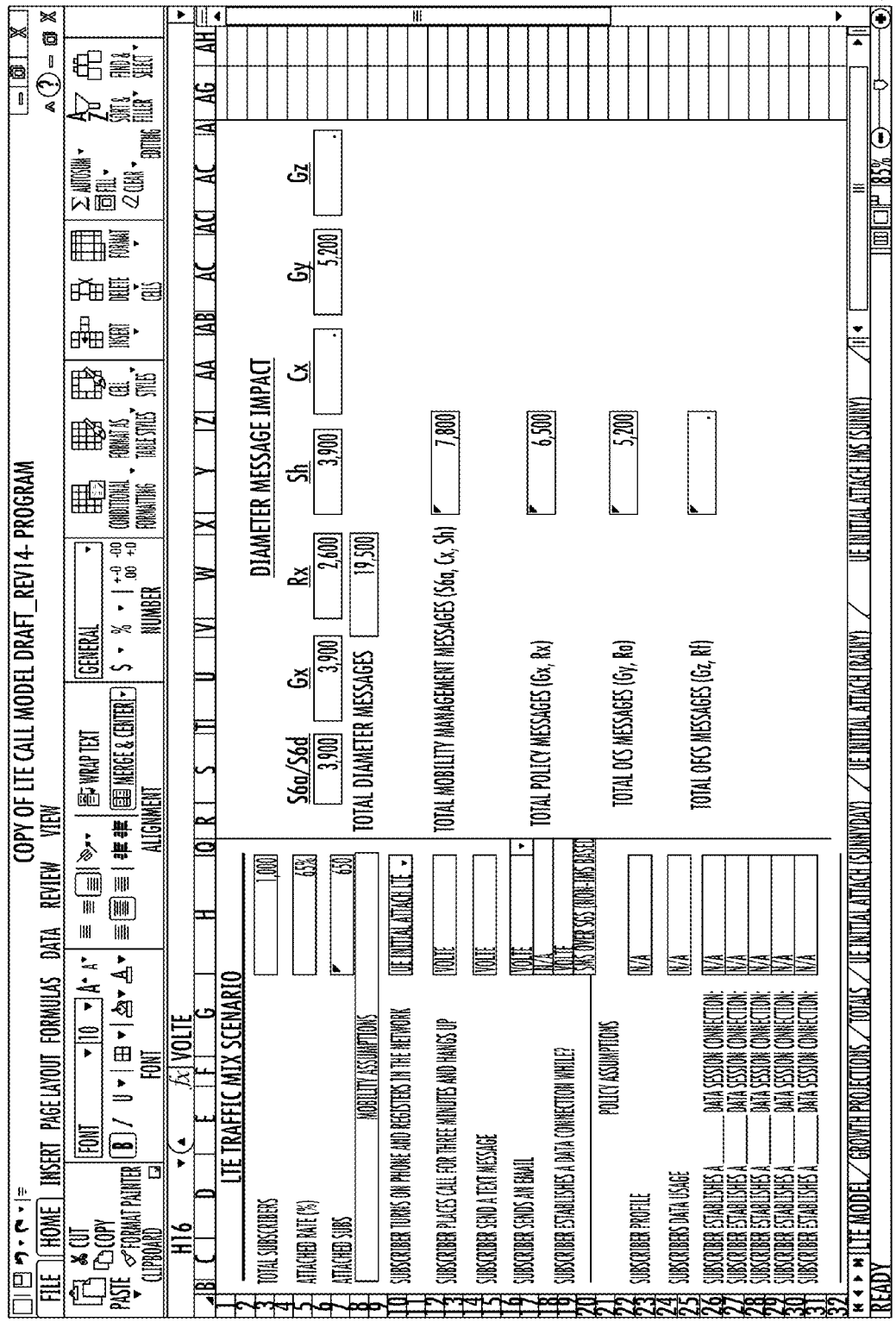
FIG. 5 is a diagram illustrating a drop down menu of the graphical user interface for the user to select yet another subscriber activity type of sending an email according to an embodiment of the subject matter described herein.

The subject matter described herein includes methods, systems, and computer readable media for providing a Diameter traffic estimator. In one system, the Diameter traffic estimator includes a graphical user interface for receiving user input regarding the number of subscribers, subscriber activity types, and policy assumptions. FIG. 1 is a diagram illustrating an exemplary graphical user interface for a Diameter traffic estimator according to an embodiment of the subject matter described herein.

In FIG. 1 and the diagrams that follow, embodiments of the subject matter shown herein are shown as being implemented using Microsoft Excel®. However, the subject matter described herein is not limited to a Diameter traffic estimator implemented using Microsoft Excel®. Any suitable application that includes the ability to estimate Diameter traffic based on user input scenarios is intended to be within the scope of the subject matter described herein. For example, the subject matter described herein can be implemented using a smartphone application (app) that performs the same calculations and presents similar user interfaces to those described herein in the Excel® examples.

FIG. 1 is a diagram illustrating an exemplary graphical user interface of a Diameter traffic estimator according to an embodiment of the subject matter described herein. In the graphical user interface of FIG. 1, the left hand side of the interface provides user-modifiable fields for the user to input an LTE traffic mix scenario, mobility assumptions, and policy assumptions. The right hand side of the diagram illustrates exemplary indications of Diameter traffic volume determined by a Diameter traffic estimator based on the user input traffic mix scenarios according to an embodiment of the subject matter described herein. In the illustrated example, the indications of Diameter traffic volume include Diameter messages per interface, total Diameter messages, and Diameter messages per category given the input provided by the user in the left hand side of the Diagram. For example, in cell H3, the interface allows the user to input a number of subscribers. In cell H5, the interface allows the user to input an attachment rate. In the illustrated example, the user has input that there are 1,000 subscribers and an attachment rate of 65%, yielding 650 attached subscribers, indicated by cell H7. As no subscriber activity types have been selected, the cells on the right hand side of the diagram, which lists the number of Diameter messages on various interfaces, are all blank.

In one exemplary implementation, the boxes for the various interfaces on the right hand side of the screen may be displayed on a network diagram that shows the network position of each interface. When the numbers of Diameter messages are determined, the numbers will appear on the network diagram at the location of the particular interface. Such an interface provides better visualization of the number of messages on each interface and of which Diameter nodes will be affected.

Figure 2:
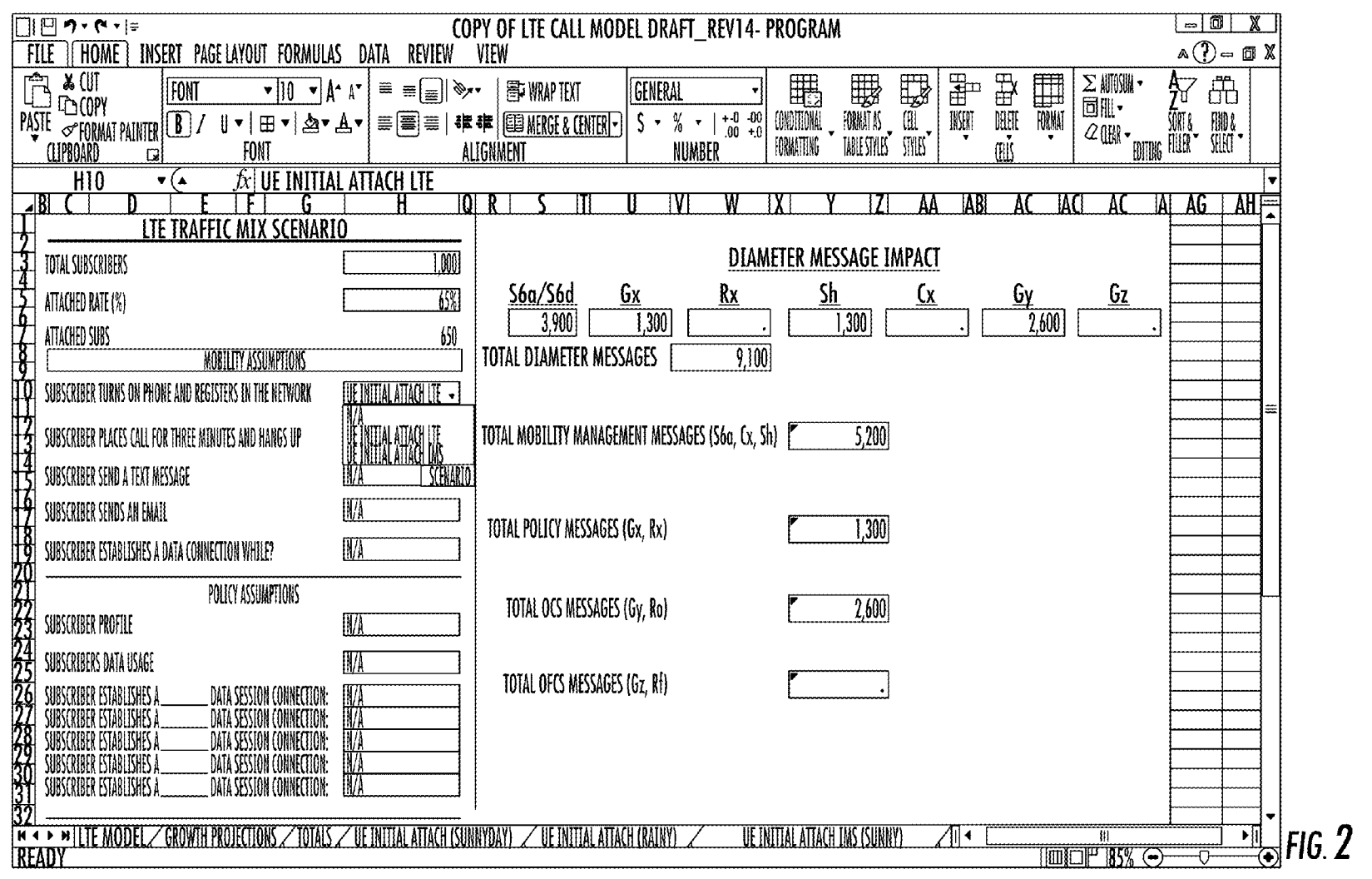

FIG. 2 is a diagram illustrating the graphical user interface of FIG. 1 where the user selects a network attachment type. Referring to FIG. 2, in cell H10, a drop down menu is provided for the subscriber to select a network attachment type. In the illustrated example, the types are LTE and IMS, and LTE is selected. When LTE is selected, a Diameter estimation engine automatically populates the boxes on the right hand side of the diagram to illustrate the per interface and total number of Diameter messages for 650 subscribers to attach to an LTE network.

For example, for the S6a/S6d interface, which is actually two interfaces, one between the mobility management entity (MME) and the home subscriber server (HSS) and the other between the HSS and the serving general packet radio service support node (SGSN), there will be a total of 3,900 messages for 1,000 subscribers and a 65% attachment rate. For a single subscriber there are six messages exchanged on the S6a and S6d interfaces during an LTE UE attachment procedure. For 650 subscribers, the total number of messages is 3,900. Similarly, for an LTE UE attachment, there are two messages exchanged on the Gx interface. The Gx interface is the interface between a PCRF and a PCEF. For 650 attached subscribers, the total number of Gx messages exchanged would be 1,300. Similar calculations are performed for the Sh and Gy interfaces. There are no messages exchanged on the Rx, Cx, and Gz interfaces for an LTE UE attachment. The total number of Diameter messages of 9,100 is displayed in cell W10. Similarly, the total number of mobility management messages, i.e., those on the S6a, Cx, and Sh interfaces is displayed in cell Y12. The total number of policy messages is displayed in cell Y18. The total number of online charging system (OCS) messages is displayed in cell Y21. The total number of offline charging system (OFCS) messages is displayed in cell Y25.

Figure 3:
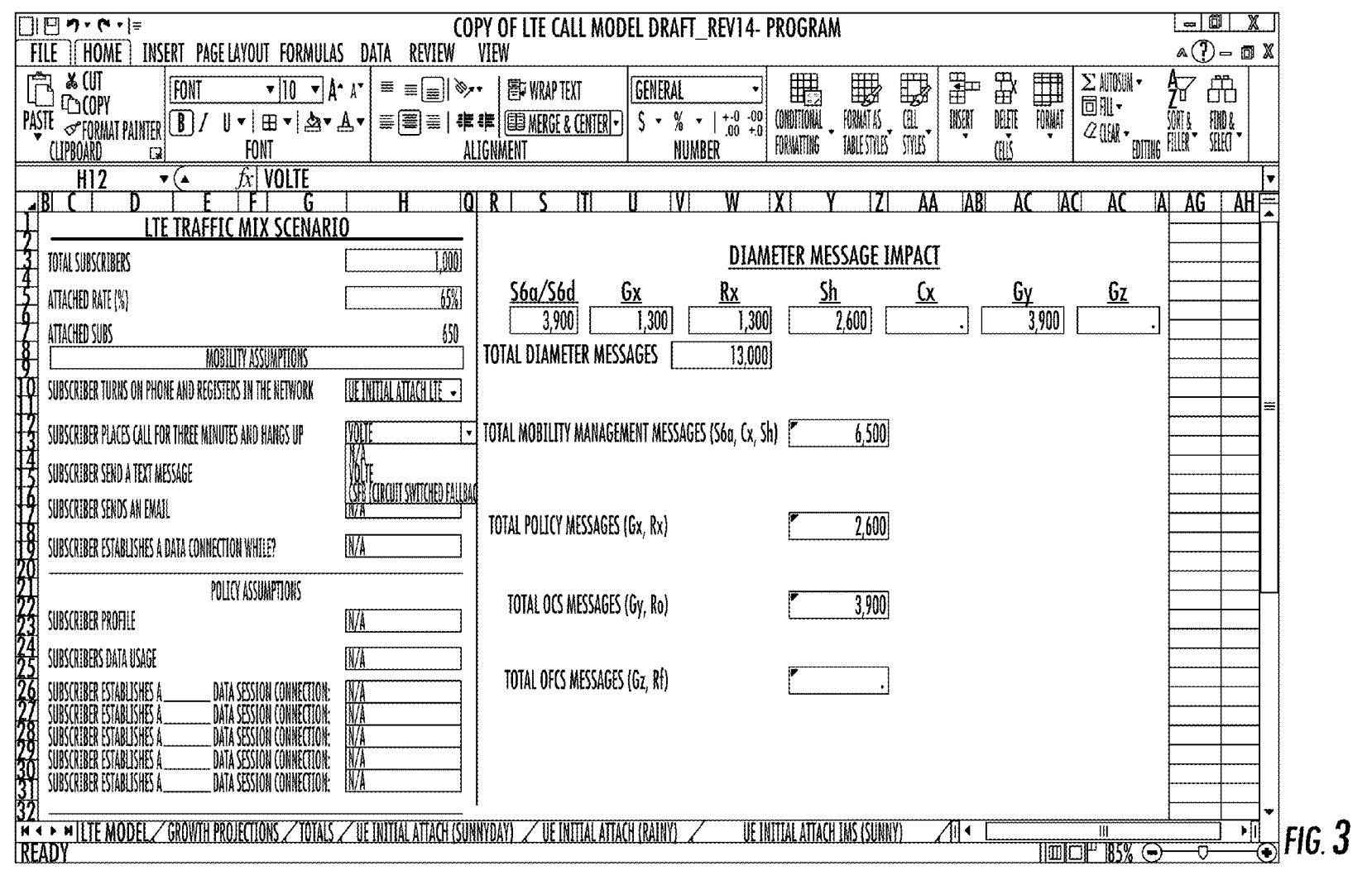

In addition to calculating and displaying Diameter traffic estimates for UE attachments, a Diameter traffic estimator according to an embodiment of the subject matter described herein may also determine (either through mathematical calculation or using a look up table) and display Diameter traffic estimates for a voice call. FIG. 3 is a diagram of the graphical user interface of FIG. 1, where user configurable values and corresponding Diameter traffic estimates for a voice call are displayed according to an embodiment of the subject matter described herein. Referring to FIG. 3, cell H12 allows the subscriber to select a first subscriber activity type of a three minute call in an LTE or a circuit switched network. In the illustrated example, the subscriber has selected a voice-over LTE call, which changes the total number of Diameter messages and the number of messages on some of the interfaces on the right hand side of the diagram. In the illustrated example, the Diameter traffic estimator has determined that there will be 3,900 messages on the S6a/S6d interface for a three minute voice over LTE call, given 650 attached subscribers. This calculation is determined by the fact that there are six messages on the S6a/S6d interface for such a call. On the Gx interface, there are 1,300 total messages for 650 subscribers each participating in a three minute voice over LTE call. The Diameter traffic estimator determines that there are 1,300 messages on the Rx interface. The Rx interface lies between an application function (AF) and the PCRF. There are typically two messages on such interface per call for a voice over LTE call. Accordingly, Diameter traffic estimator estimates 1,300 messages for 650 attached subscribers. On the Sh interface, the Diameter traffic estimator estimates 2,600 messages. On the Gy interface, the Diameter traffic estimator estimates 3,900 messages. The total number of Diameter messages for a voice over LTE call is shown in cell W7 to be 13,000. Of these, the Diameter traffic estimator determines that 6,500 are mobility management messages, 2,600 are policy messages, and 3,900 are OCS messages.

Figure 4:
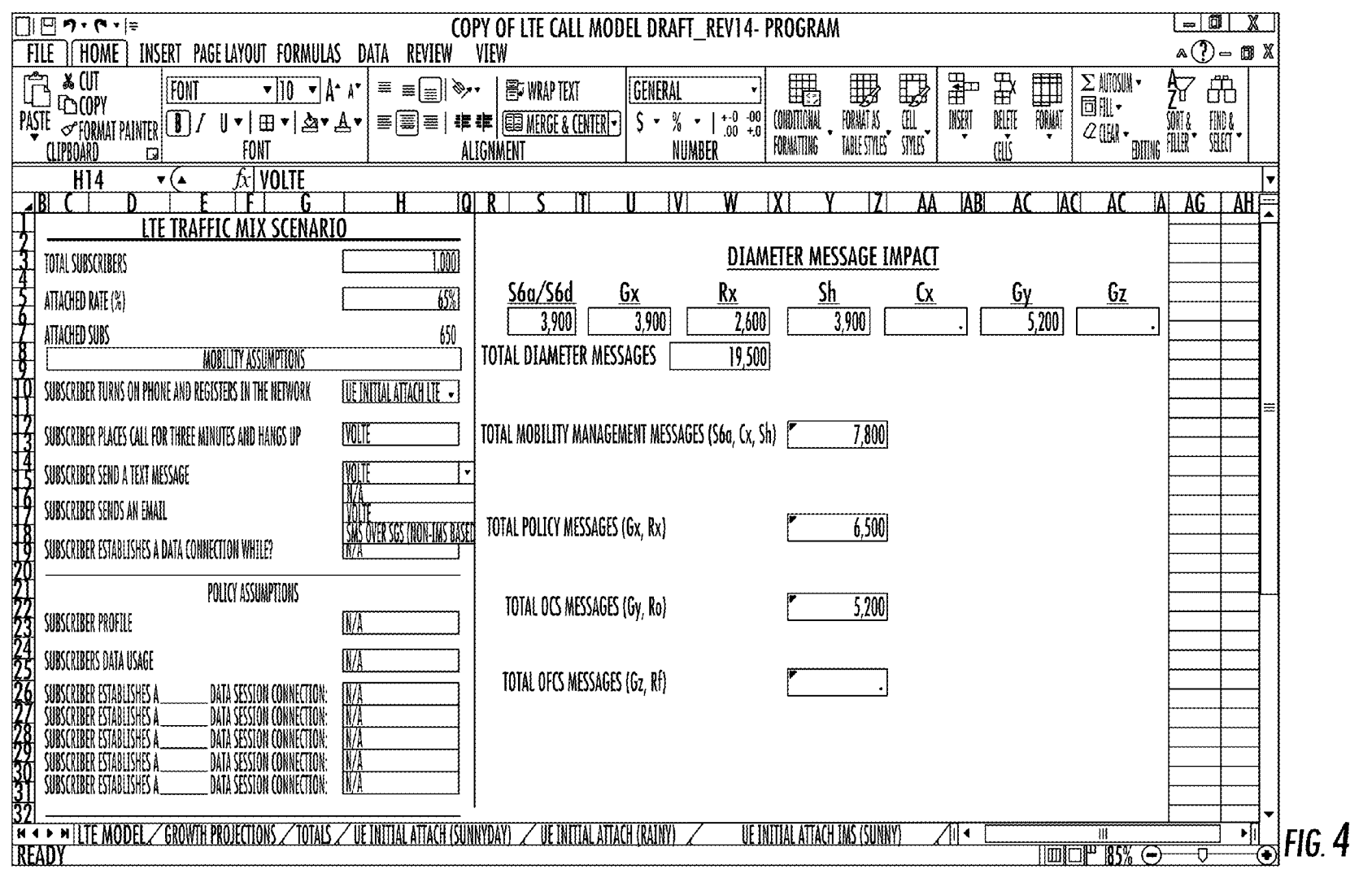

In addition to estimating Diameter traffic for voice calls, a Diameter traffic estimator according to an embodiment of the subject matter described herein also estimates the Diameter traffic for other subscriber behaviors, including sending text messages. FIG. 4 is a diagram illustrating exemplary traffic calculations that may be performed by a Diameter traffic estimator according to an embodiment of the subject matter described herein for 650 attached subscribers that place a three minute voice over LTE call and send a voice over LTE text message. Referring to FIG. 4, in cell H14, the user selects a VoLTE text message as an additional subscriber behavior or activity type. The user selects whether the text message will be sent over LTE or over a non-IMS based interface. As illustrated on the right hand side of the diagram, the total number of Diameter messages and the number of messages on some of the interfaces change in response to selecting the sending of a text message. For example, the number of messages exchanged on the Gx interface changes from 1,300 for the voice over LTE call to 3,900 for a text message in addition to the call. This change reflects an additional four messages on the Gx interface required for sending a text message over an LTE network. The messages on the Rx interface increase from 1,300 to 2,600 reflecting two additional Rx messages per subscriber for sending a text message in addition to the voice over LTE call. On the Sh interface, the number of messages increases from 2,600 to 3,900, which reflects an additional two messages per subscriber for sending the text message. On the Gy interface, the number of messages increases from 3,900 to 5,200, which reflects an additional two Gy messages. The total number of Diameter messages for sending a text message in addition to a three minute voice over LTE call increases from 1,300 to 19,500, which reflects an additional ten messages per subscriber. Of the total number of messages, 7,800 are determined to be mobility management messages, 6,500 are classified as policy messages, and 5,200 are classified as OCS messages. Thus, a Diameter traffic estimator according to an embodiment of the subject matter described herein allows operators to keep track of the cumulative total number of Diameter messages as the number of subscriber activities in the network increases.

Yet another subscriber activity type for which a Diameter traffic estimator according to an embodiment of the subject matter described herein may be used to estimate Diameter traffic is subscriber emails. FIG. 5 is a diagram illustrating an exemplary interface and corresponding calculations that may be performed by a Diameter traffic estimator when a subscriber sends an email message after or during a voice over LTE call. Referring to FIG. 5, in cell H16, the subscriber selects the sending of an email message over a voice over LTE network. The sending of an email over an LTE network changes the number of Diameter messages in some of the boxes illustrated on the right hand side of the diagram.

Figure 6:
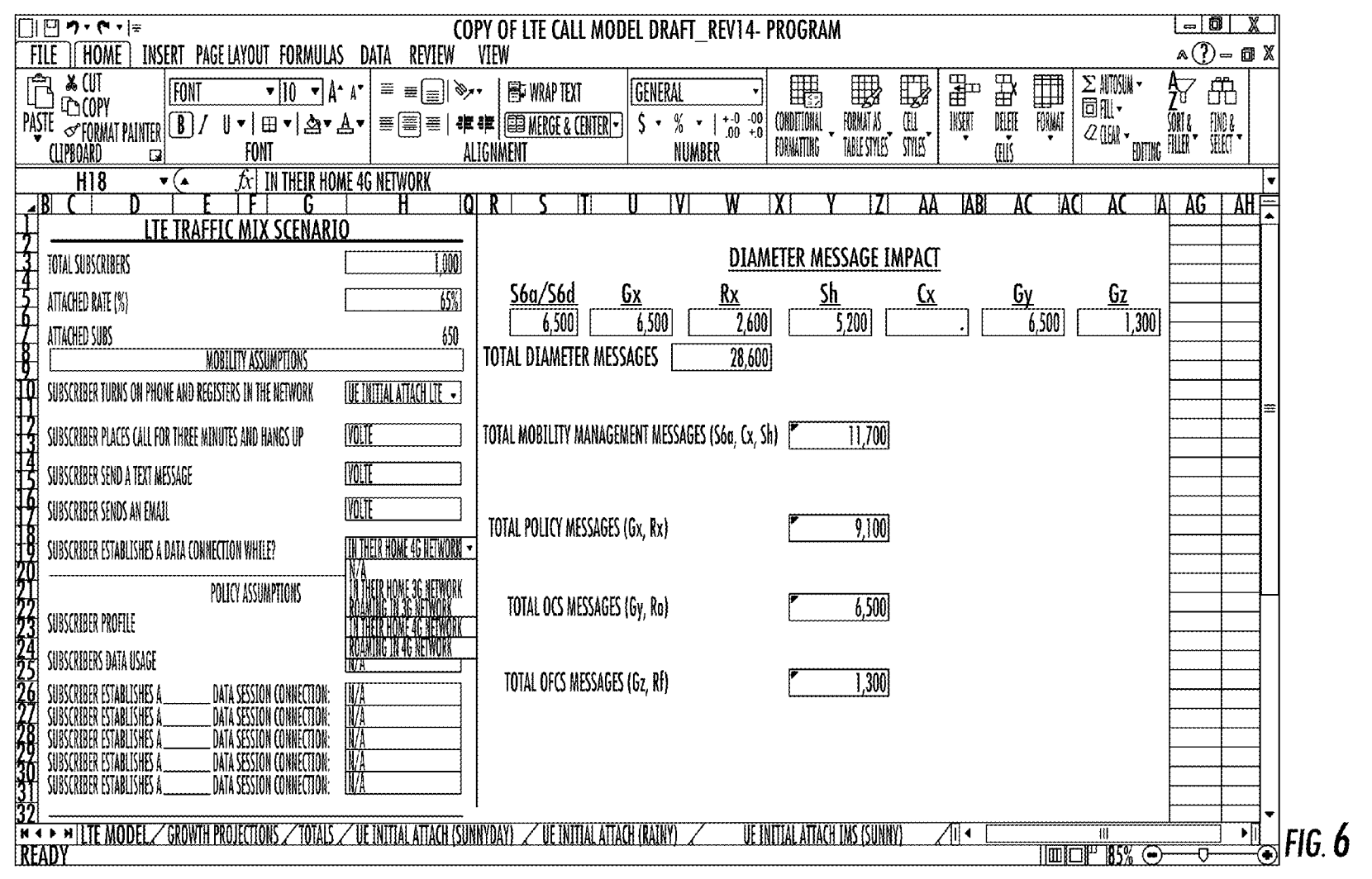

FIG. 6 is a diagram illustrating a portion of the graphical user interface for estimating the impact of subscriber email activity on Diameter message traffic. Referring to FIG. 6, yet another subscriber activity type that can be selected is the establishment of a data connection while roaming or being in the subscriber's home network. In FIG. 6, in cell H18, the Diameter traffic estimator presents the subscriber with a pull down menu of various roaming or home network options for establishment of the data connection. In the illustrated example, the subscriber selects that the subscriber is in the subscriber's home 4G network when the data connection is established. The numbers of generated Diameter messages on the right hand side of the diagram are adjusted accordingly due to the number of messages generated by the data connection. For example, the total number of S6A/S6D interface messages increases from 3,900 to 6,500, reflecting an additional six messages per subscriber for the data connection. The total number of messages sent over the Gx interface also increases from 3,900 to 6,500. The number of Rx messages does not change. The number of Sh messages increases from 3,900 to 5,200, reflecting an additional two Sh messages per subscriber. The total number of Gy messages increases from 5,200 to 6,500, representing an additional two messages per subscriber. The total number of Gz messages increases from zero in FIG. 5 to 1,300 in FIG. 6, which reflects an additional two messages per subscriber. The total number of Diameter messages for a data network connection in the subscriber's home network is 11,700, which is an increase of 3,900 messages or six messages per subscriber over the number required in FIG. 6. Of these messages, 11,700 are classified as mobility management, 9,100 are classified as policy, 6,500 are classified as OCS, and 1,300 are classified as OFCS.

Figure 7:
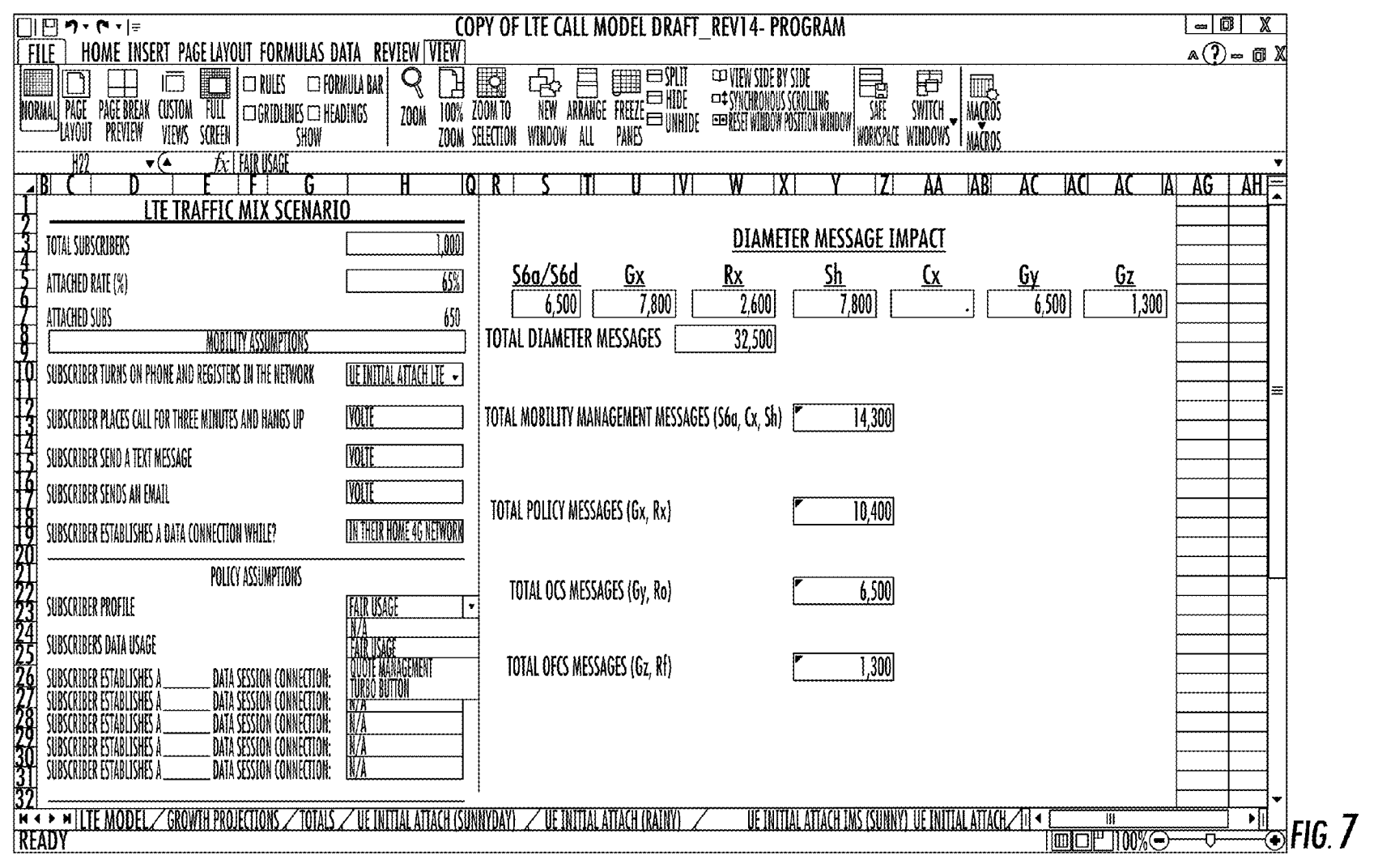

According to another aspect of the subject matter described herein, the Diameter traffic estimator allows the user to select a policy profile for a subscriber and estimates the number of messages required for providing the policy profile. FIG. 7 is a diagram that illustrates exemplary policy profiles and corresponding Diameter traffic calculations. Referring to FIG. 7, cell H22 provides a drop down menu in which the user can select a fair usage or other policy assumption to be applied to the network usage of each subscriber. The result of the user selecting one of the policy assumptions changes the number of policy and other types of Diameter messages on the right hand side of the Figure. In the illustrated example, the user has selected a fair usage policy profile. The selection of a fair usage policy greatly increases the number of policy messages over the data connection illustrated in FIG. 6. For example, the total number of policy messages increases from 9,100 to 10,400, which reflects an additional two messages per subscriber. The total number of mobility management messages also increases from 11,700 to 14,300, reflecting an additional four messages per subscriber.

In the example illustrated in FIGS. 6 and 7, it is assumed that the subscriber has established a data connection while on the subscriber's home 4G network and that the subscriber policy profile is fair usage. However, there are no traffic estimates for the subscriber sending traffic over the data connection. FIG. 8 illustrates exemplary Diameter traffic estimates assuming a subscriber data connection in the subscriber's 4G home network, a fair usage policy profile, and medium subscriber data usage. Referring to FIG. 8, cell H24 of the graphical user interface allows the user to select subscriber data usage. In the illustrated example, the user has selected medium data usage. The user selection of medium data usage changes the number of Diameter messages generated illustrated on the right hand side of the diagram. It can be seen from FIG. 8 that the total number of Diameter messages for medium data usage over the data connection increases from 32,500 in FIG. 7 to 45,500 in FIG. 8 reflecting an additional 20 Diameter messages per subscriber. The number of messages increases on all of the illustrated interfaces, reflecting increased management traffic powered by the data connection.

Figure 9:
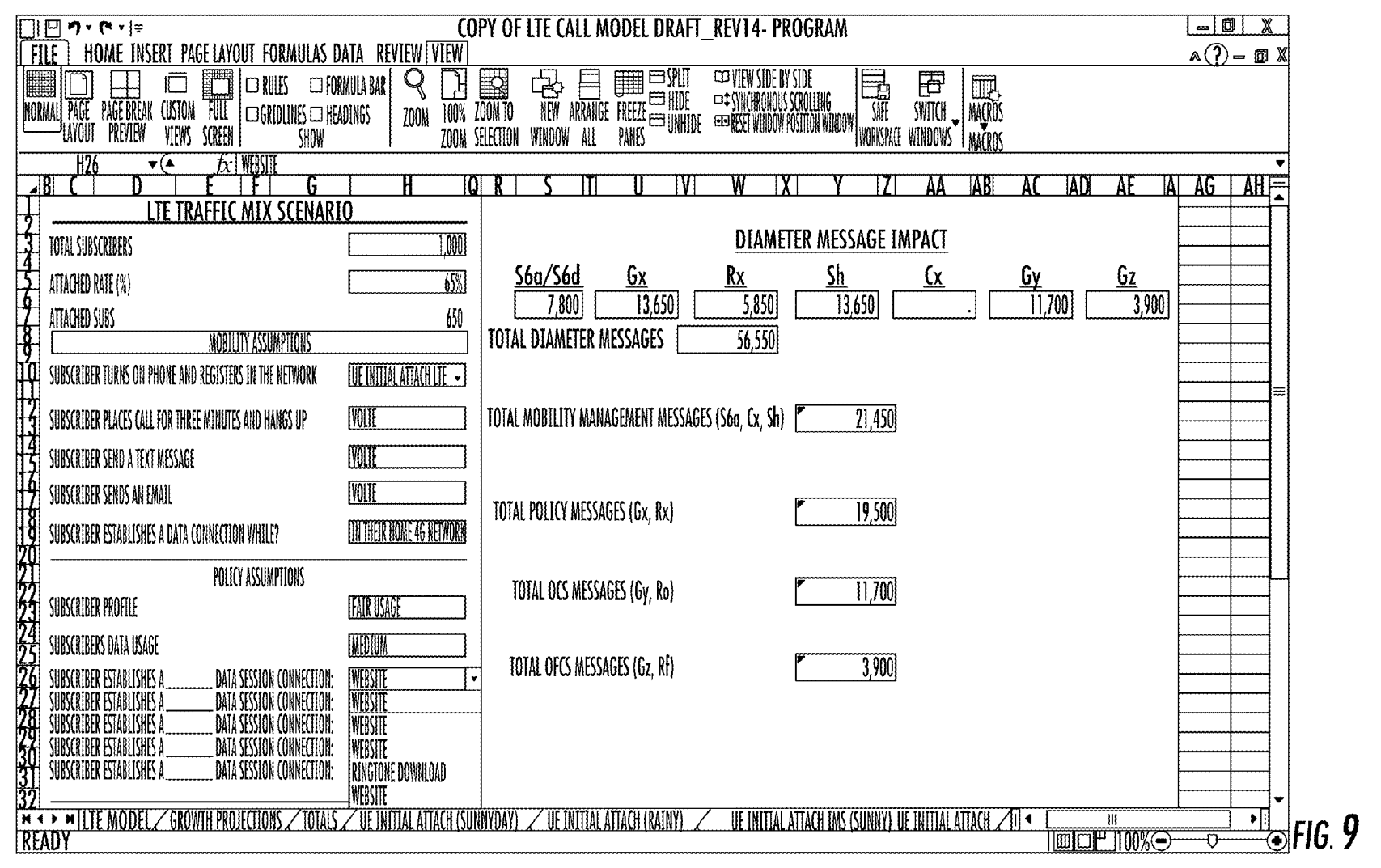

Yet another capability of a Diameter traffic estimator according to an embodiment of the subject matter described herein is to estimate the an indication of Diameter traffic volume generated by a specific application type over a data network connection, such as social networking, video chat, data replication, file downloads, and web browsing. FIG. 9 illustrates an example of Diameter traffic estimates for a Facebook® application, which is one example of a social networking application. Other examples of social networking applications illustrated in FIG. 9 include Twitter® and Foursquare®. The same assumptions from FIG. 8 of fair usage and medium subscriber data utilization apply. It can be seen from cell W7 in FIG. 9 and a comparison with the corresponding cell in FIG. 8 that the number of additional messages required by a Facebook® connection is 11,050, reflecting an additional 17 messages per subscriber over the example illustrated in FIG. 8. The number of messages increases on each illustrated interface for a Facebook® connection.

According to yet another aspect of the subject matter described herein, a Diameter traffic estimator allows operators to input growth projections and determines estimated Diameter traffic based on the growth projections.

Figure 10:
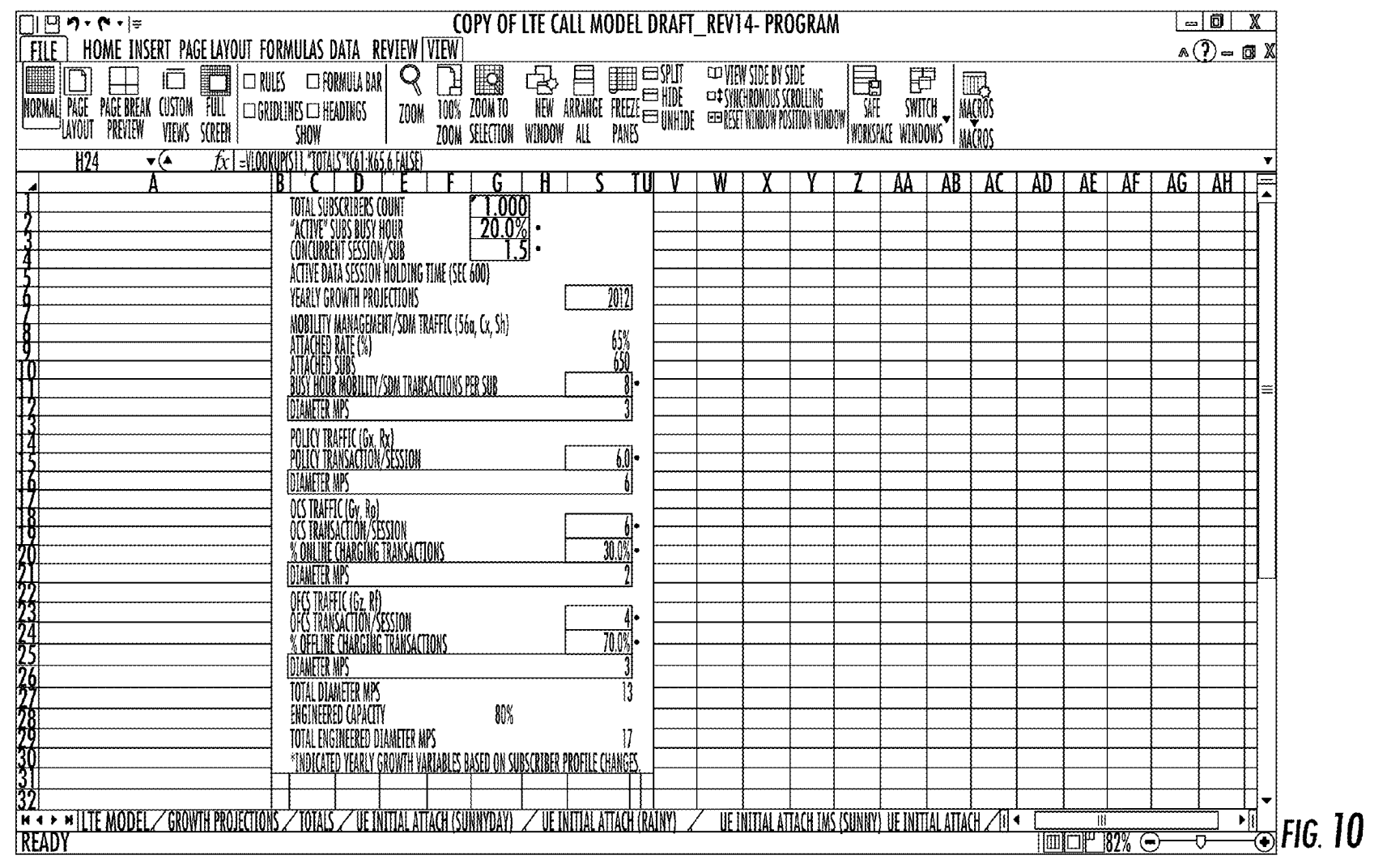

FIG. 10 is a diagram illustrating an exemplary graphical user interface for selecting growth projections and presenting total and per interface Diameter messages per second according to an embodiment of the subject matter described herein. Referring to FIG. 10, cells G3 through G5 allow the user to input a total subscriber count, active subscribers during busy hour, and the average number of sessions per subscriber. The active session holding time is assumed to be 600 seconds. Cell S10 allows the user to select a year for which Diameter traffic growth is being projected. Cell S16 provides an estimate of the busy hour mobility/SDM transactions per subscriber. Cell S16 presents an estimated value for the number of Diameter messages per second for mobility management traffic. Cell S20 is a prediction of the number of policy transactions per session. Cell S21 illustrates an estimated number of Diameter messages per second for the policy traffic. Similar projections are made in cell S26 for online charging system (OCS) traffic and in cell S31 for offline charging system (OFCS) traffic. Assuming an engineered capacity of 80%, the total engineered Diameter messages per second for the assumptions made in FIG. 10 is assumed to be 17. The assumptions in the projections illustrated in FIG. 10 are made based on data from industry and analysts and will be illustrated in more detail below.

Figure 11A:
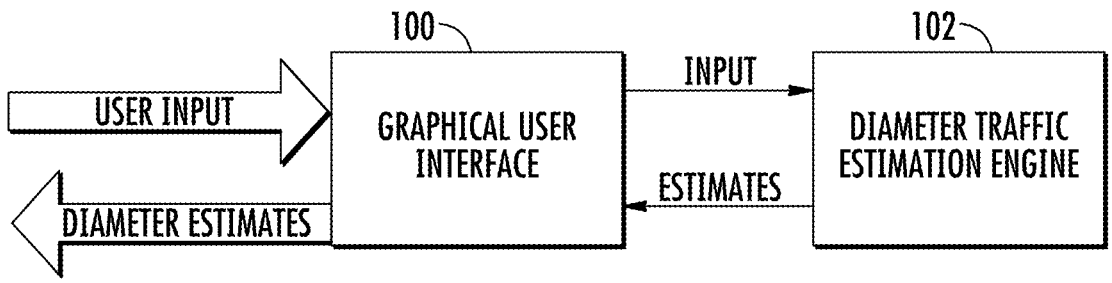
FIG. 11A is a block diagram of a system for providing a Diameter traffic estimator according to an embodiment of the subject matter described herein.

FIG. 11A is a block diagram illustrating exemplary components of a Diameter traffic estimator according to an embodiment of the subject matter described herein. Referring to FIG. 11A, a graphical user interface 100 receives user input. Graphical user interface 100 may present screens similar to FIGS. 1-10 described above to obtain input from the user. Graphical user interface 100 provides the user input to a Diameter traffic estimation engine 102. Diameter traffic estimation engine 102 may compute Diameter traffic estimates which are presented to the user via graphical user interface 100.

Figure 12A:
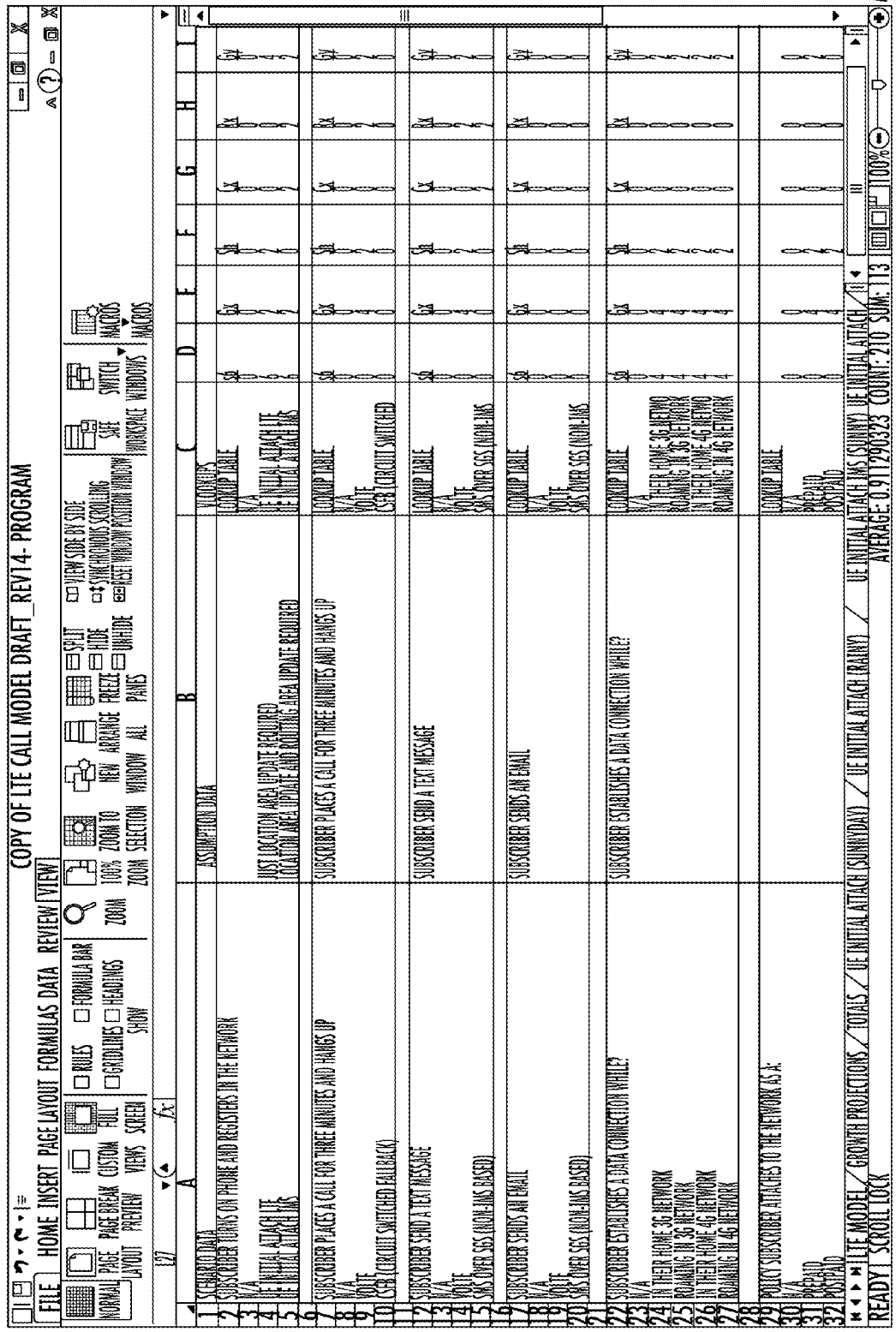
FIGS. 12A and 12B are diagrams of exemplary lookup tables that may be used to estimate Diameter traffic volume according to an embodiment of the subject matter described herein.
Figure 12B:
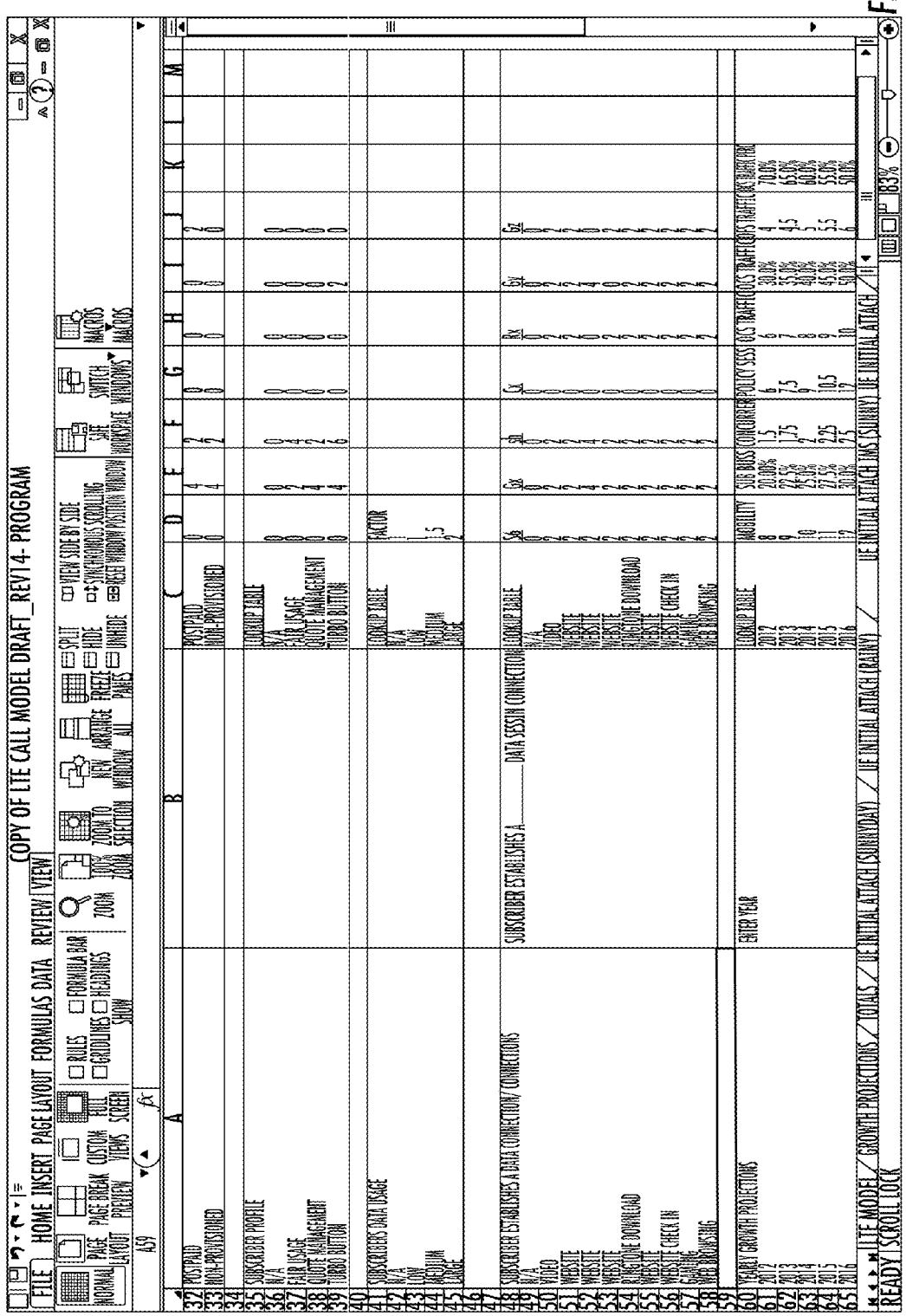

Diameter traffic estimation engine 102 may use stored values or formula for determining the Diameter traffic estimates. FIGS. 12A and 12B illustrate exemplary lookup tables that may be used by the Diameter traffic estimation engine in making the Diameter traffic estimates. For example, referring to FIG. 12A, the first lookup table illustrates the number of messages on each interface is a UE initially attaches to an LTE or an IMS network. The remaining tables in FIG. 12A correspond to subscriber network activity types. The table that spans FIGS. 12A and 12B corresponds to numbers of policy messages that are generated for pre-paid and post-paid subscribers attaching to the network. In FIG. 12B, the lookup tables contain estimates for different subscriber policy profiles, subscriber data usage, and specific types of data connections. The last table in FIG. 12B corresponds to growth projections based on changing subscriber behaviors over time. The last table in FIG. 12B is used by the Diameter estimation engine to output the growth projections illustrated in FIG. 10.

Figure 11B:
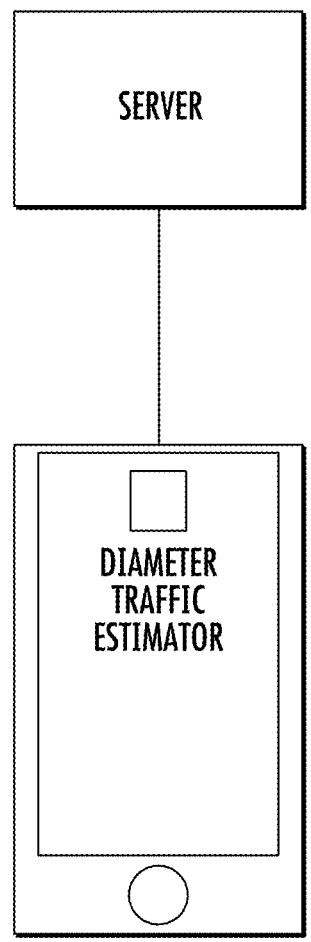
FIG. 11B is a diagram of a Diameter traffic estimator implemented as smart phone application according to an embodiment of the subject matter described herein.

In one exemplary implementation, the Diameter traffic estimation engine and the graphical user interface illustrated in FIG. 11A may be implemented and/or invoked using a smart phone application, a tablet application, or other type of computer application. For example, the graphical user interface may be invoked by the user clicking on a Diameter traffic estimation icon displayed on the user's smart phone. FIG. 11B illustrates an example of a smart phone with a Diameter traffic estimator icon. The Diameter traffic estimator may be an application that is wholly contained on the smart phone which stores the look up tables illustrated in FIGS. 12A and 12B, the graphical user interface, and the Diameter traffic estimation engine. The Diameter traffic estimator may be periodically updated by a server. Alternatively, the Diameter traffic estimator application may simply be a client that accesses or invokes a graphical user interface and a Diameter traffic estimation engine that resides on the server. Either embodiment is intended to be within the scope of the subject matter described herein. The graphical user interface may be presented to the user via the user's smart phone screen. The user may input the requested parameters as described above and receive Diameter traffic estimates. Such an application may be a useful tool for network operators, equipment vendors, and technicians for planning and engineering networks that handle Diameter traffic.

Figure 13:
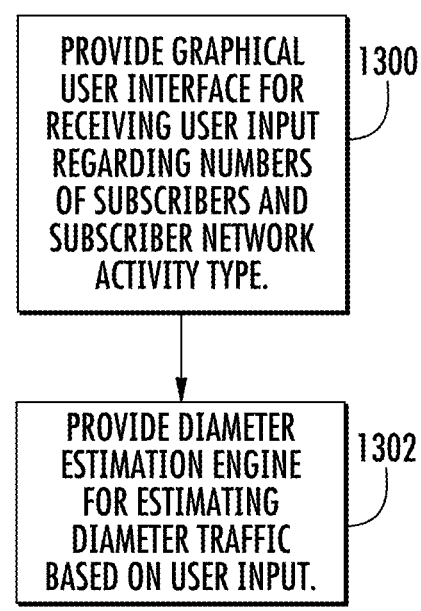
FIG. 13 is a flow chart illustrating exemplary steps for providing a Diameter traffic estimator according to an embodiment of the subject matter described herein.

FIG. 13 is a flow chart illustrating exemplary steps for providing a Diameter traffic estimator according to an embodiment of the subject matter described herein. Referring to FIG. 13, in step 1300, a graphical user interface for receiving user input regarding a number of subscribers and user input regarding a subscriber network activity type is provided. Other user input that may be received and used to estimate the number of Diameter messages include the number of concurrent sessions, the number of estimated sessions for mobility, the number of active subscribers during busy hour, and the number of policy transactions per session. For example, the graphical user interface may be similar to that illustrated in FIGS. 1-10 above. In step 1302, a Diameter traffic estimation engine is provided for estimating an indication of Diameter traffic volume based on the user input regarding the number of subscribers, subscriber network activity type, and/or any of the other user input described herein. The Diameter traffic estimation engine may use formula or lookup tables similar to those illustrated in FIGS. 12A and 12B to determine the Diameter traffic volume estimates illustrated in the interfaces of FIGS. 1-10.

In the examples described above, the Diameter traffic estimator estimates the number of Diameter messages in total, per interface, and per category for various traffic mix scenarios. However, the subject matter described herein is not limited to providing only these estimates of Diameter traffic volume or for the traffic mix scenarios described above. FIGS. 14 and 15 illustrate alternate calculations that may be performed by a Diameter traffic estimator according to an embodiment of the subject matter described herein. In FIGS. 14 and 15, the columns on the right hand side of the spreadsheet illustrate typical network services and phases for LTE network evolution. In FIG. 14, Table 1400 indicates user input for numbers of subscribers for each LTE network adoption phase. Table 1402 represents the number of packet data network (PDN) connections, as indications of Diameter traffic volume for each LTE network adoption phase. Table 1404 illustrates numbers of mobility management and authentication transactions for each LTE network adoption phase.

FIG. 15 illustrates policy, OCS, and OFCS transaction estimates for the same LTE adoption phases illustrated in FIG. 14. In FIG. 15, table 1500 illustrates policy transaction estimates for the LTE adoption phases illustrated in FIG. 14. Table 1502 illustrates OCS transaction estimates for the LTE adoption phases illustrated in FIG. 14. Table 1504 illustrates OFCS transaction estimates for the LTE adoption phases illustrated in FIG. 14. Table 1506 represents total Diameter traffic volume estimates for all of the traffic types illustrated in FIGS. 14 and 15. Totals are estimated for both transactions per second (TPS) and messages per second (MPS).

FIG. 16 illustrates policy tables used to generate the policy transaction estimates illustrated in FIGS. 14 and 15. In FIG. 16, table 1600 includes different types of policy events, the number of transactions per event, and the number of events per hour for each LTE network adoption phase. Table 1602 illustrates numbers of policy events for different subscriber policy groups and the LTE network adoption phases.

FIG. 17 is a table illustrating numbers of mobility management and authentication transactions per interface for different traffic mix assumptions and LTE adoption phases. In FIG. 17, numbers of mobility management transactions for LTE UE attachment and detachment, 3G attachment and detachment, LTE and 3G roaming transactions, such as tracking area update (TAU) and roaming area update (RAU) transactions, 3G and LTE voice calls, EIR validations, and Wi-Fi transactions. The table illustrated in FIG. 17 can be used by the Diameter traffic estimator to estimate transactions per second for the mobility management transactions illustrated in FIG. 17.

FIG. 18 is a table illustrating the numbers of transactions per interface for different mobility management scenarios illustrated in FIG. 16. For example, an LTE UE attachment includes authentication information request (AIR)/authentication information answer (AIA) transaction, one update location request (ULR)/update location answer (ULA) transaction, and one cancel location request (CLR)/cancel location answer (CLA) transaction, for a total of three transactions. The transactions are listed per interface, including S6a/S6d, Sh, SLg, SLh, S13, and SWx. The numbers of transactions illustrated in FIG. 18 may be used to populate the truncation totals illustrated in FIG. 17 for the various transaction types. A Diameter transaction estimator may include similar tables for populating transactions per second per interface for charging and policy transaction, similar to the tables illustrated in FIGS. 12A and 12B.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for providing a Diameter traffic estimator, the system comprising:
   a processor;
   a user graphical interface configured, using the processor, to receive user input regarding a number of subscribers and user input regarding a subscriber network activity; and
   a Diameter traffic estimation engine configured, using the processor, to estimate an indication of Diameter traffic volume based on the user input regarding the number of subscribers and the subscriber network activity type by determining an expected number of Diameter signaling messages to be generated in a signaling network of a telecommunications network for the subscriber network activity and estimating the indication of Diameter traffic volume using the expected number of Diameter signaling messages and the number of subscribers, wherein the indication of Diameter traffic volume comprises a total number of Diameter messages, and wherein the telecommunications network is an IP multimedia subsystem (IMS) network or a long term evolution (LTE) network; and
   wherein the user graphical interface is configured, using the processor, to display the indication of Diameter traffic volume.

2. The system of claim 1 wherein the Diameter traffic estimation engine is configured to determine, for each interface of a plurality of Diameter interfaces, an estimated number of Diameter messages for the interface based on the user input regarding the number of subscribers and the subscriber network activity type, and wherein the indication of Diameter traffic volume comprises the estimated number of Diameter messages for each interface of the plurality of Diameter interfaces.

3. The system of claim 2 wherein the Diameter interfaces include at least one interface selected from the group consisting of an S6a, an S6d interface, a Gx interface, an Rx interface, an Sh interface, a Cx interface, a Gy interface, and a Gz interface.

4. The system of claim 1 wherein the Diameter traffic estimation engine is configured to determine, for each category of a number of Diameter message categories, an estimated number of Diameter messages for the category based on the user input regarding the number of subscribers and the subscriber network activity type, and wherein the indication of Diameter traffic volume comprises the estimated number of Diameter messages for each category of the plurality of Diameter message categories.

5. The system of claim 4 wherein the Diameter message categories include at least one category selected from the group consisting of mobility management, policy, online charging system (OCS) and offline charging system (OFCS).

6. The system of claim 1 wherein the graphical user interface is configured to receive user input regarding a network type and wherein the Diameter estimation engine is adapted to estimate the indication of Diameter traffic volume based on the network type.

7. The system of claim 1 graphical user interface is configured to receive user input regarding a subscriber network attachment rate and wherein the Diameter estimation engine is adapted to estimate the indication of Diameter traffic volume based on the attachment rate.

8. The system of claim 1 wherein the subscriber network activity type includes at least one activity selected from the group consisting of user equipment (UE) attachment, voice calls, sending text messages, sending email, and participating in data sessions.

9. The system of claim 1 wherein the graphical user interface is configured to receive user input regarding application type and wherein the Diameter traffic estimator is configured to estimate the indication of Diameter traffic volume based on the application type.

10. The system of claim 9 wherein the application type includes at least one application type selected from the group consisting of social networking, video chat, data replication, file downloads, and web browsing.

11. The system of claim 1 wherein the graphical user interface is configured to receive user input requesting Diameter traffic growth projections and wherein the Diameter estimation engine is configured to estimate a number of Diameter messages per second based on the requested Diameter traffic growth projection.

12. The system of claim 1 wherein the graphical user interface and the Diameter traffic estimation engine are configured to be invoked by a smart phone, tablet, or other computer application.

13. A method for providing a Diameter traffic estimator, the method comprising:
   providing, using a processor, a user graphical interface configured to receive user input regarding a number of subscribers and user input regarding a subscriber network activity type; and
   providing, using the processor, a Diameter traffic estimation engine configured to estimate an indication of Diameter traffic volume based on the user input regarding the number of subscribers and the subscriber network activity type by determining an expected number of Diameter signaling messages to be generated in a signaling network of a telecommunications network for the subscriber network activity and estimating the indication of Diameter traffic volume using the expected number of Diameter signaling messages and the number of subscribers, wherein the indication of Diameter traffic volume comprises a total number of Diameter messages, and wherein the telecommunications network is an IP multimedia subsystem (IMS) network or a long term evolution (LTE) network; and
   wherein the user graphical interface is configured, using the processor, to display the indication of Diameter traffic volume.

14. The method of claim 13 comprising determining, for each interface of a plurality of Diameter interfaces, an estimated number of Diameter messages for the interface based on the user input regarding the number of subscribers and the subscriber network activity type, and wherein the indication of Diameter traffic volume comprises the estimated number of Diameter messages for each interface of the plurality of Diameter interfaces.

15. The method of claim 14 wherein the Diameter interfaces include at least one interface selected from the group consisting of an S6a, an S6d interface, a Gx interface, an Rx interface, an Sh interface, a Cx interface, a Gy interface, and a Gz interface.

16. The method of claim 13 comprising determining, for each category of a number of Diameter message categories, an estimated number of Diameter messages for the category based on the user input regarding the number of subscribers and the subscriber network activity type, and wherein the indication of Diameter traffic volume comprises the estimated number of Diameter messages for each category of the plurality of Diameter message categories.

17. The method of claim 16 wherein the Diameter message categories include at least one category selected from the group consisting of mobility management, policy, online charging system (OCS) and offline charging system (OFCS).

18. The method of claim 13 wherein the graphical user interface is adapted to receive user input regarding a network type and wherein the Diameter estimation engine is adapted to estimate the indication of Diameter traffic volume based on the subscriber network activity type.

19. The method of claim 13 wherein the graphical user interface is configured to receive user input regarding a subscriber network attachment rate and wherein the Diameter estimation engine is adapted to estimate the indication of Diameter traffic volume based on the attachment rate.

20. The method of claim 13 wherein the subscriber activity type includes at least one activity type selected from the group consisting of user equipment (UE) attachment, voice calls, sending text messages, sending email, and participating in data sessions.

21. The method of claim 13 wherein the graphical user interface is configured to receive user input regarding application type and wherein the Diameter traffic estimator is configured to estimate the indication of Diameter traffic volume based on the application type.

22. The method of claim 21 wherein the application type includes at least one application type selected from the group consisting of social networking, video chat, data replication, file downloads, and web browsing.

23. The method of claim 13 wherein the graphical user interface is configured to receive user input requesting Diameter traffic growth projections and wherein the Diameter estimation engine is configured to estimate a number of Diameter messages per second based on the requested Diameter growth projections.

24. The method of claim 13 comprising invoking the graphical user interface and the Diameter traffic estimation engine via a smart phone, tablet, or other computer application.

25. A non-transitory computer readable medium having stored thereon executable instructions that when executed by the processor of a computer control the computer to perform steps comprising:
   providing a graphical user interface for receiving user input regarding a number of subscribers and user input regarding a subscriber network activity type; and
   providing a Diameter traffic estimation engine for estimating an indication of Diameter traffic volume based on the user input regarding the number of subscribers and the subscriber network activity type by determining an expected number of Diameter signaling messages to be generated in a signaling network of a telecommunications network for the subscriber network activity and estimating the indication of Diameter traffic volume using the expected number of Diameter signaling messages and the number of subscribers, wherein the indication of Diameter traffic volume comprises a total number of Diameter messages, and wherein the telecommunications network is an IP multimedia subsystem (IMS) network or a long term evolution (LTE) network; and
   wherein the user graphical interface is configured, using the processor, to display the indication of Diameter traffic volume.

* * * * *